United States Patent
Jung et al.

(10) Patent No.: US 12,535,660 B2
(45) Date of Patent: Jan. 27, 2026

(54) IMAGING LENS SYSTEM

(71) Applicant: SAMSUNG ELECTRO-MECHANICS CO., LTD., Suwon-si (KR)

(72) Inventors: Jin Hwa Jung, Suwon-si (KR); In Do Seo, Suwon-si (KR); Sang Hyun Jang, Suwon-si (KR); Jong Gi Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 775 days.

(21) Appl. No.: 17/866,683

(22) Filed: Jul. 18, 2022

(65) Prior Publication Data

US 2023/0305271 A1 Sep. 28, 2023

(30) Foreign Application Priority Data

Mar. 28, 2022 (KR) ........................ 10-2022-0038054

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
None
See application file for complete search history.

(56) References Cited

U.S. PATENT DOCUMENTS

| 11,686,922 B2 | 6/2023 | Lin et al. |
| 2017/0184819 A1 | 6/2017 | Shi |
| 2018/0164553 A1 | 6/2018 | Son |
| 2019/0154974 A1 | 5/2019 | Chen |
| 2019/0204555 A1 | 7/2019 | Jhang et al. |

(Continued)

FOREIGN PATENT DOCUMENTS

| CN | 113093371 A | 7/2021 |
| CN | 113267874 A | 8/2021 |

(Continued)

OTHER PUBLICATIONS

Korean Office Action issued on Mar. 26, 2025, in corresponding Korean Patent Application No. 10-2022-0038054. (6pages in English, 5pages in Korean).

(Continued)

*Primary Examiner* — Phu Vu
(74) *Attorney, Agent, or Firm* — NSIP Law

(57) ABSTRACT

An imaging lens system is provided. The imaging lens system includes a first lens having a concave object-side surface; a second lens having positive refractive power; a third lens having refractive power; a fourth lens having refractive power; a fifth lens having refractive power; a sixth lens having an Abbe number greater than 20 and less than 40; and a seventh lens having refractive power, wherein the first to seventh lenses are sequentially arranged from an object-side to an imaging side, and the imaging lens system satisfies the following conditional expressions: TTL/(ImgHT*2)<0.8, and 100°<FOV, where TTL is a distance from the object-side surface of the first lens to an imaging plane, ImgHT is a height of the imaging plane, and FOV is an angle of view of the imaging lens system.

17 Claims, 14 Drawing Sheets

(56) References Cited

U.S. PATENT DOCUMENTS

| | | | |
|---|---|---|---|
| 2020/0379219 A1 | 12/2020 | Geng et al. | |
| 2021/0255428 A1* | 8/2021 | Lin | G02B 13/04 |
| 2021/0255429 A1 | 8/2021 | Lin et al. | |
| 2021/0271053 A1 | 9/2021 | Hu et al. | |
| 2021/0318521 A1 | 10/2021 | Wang et al. | |
| 2021/0325640 A1 | 10/2021 | Jang et al. | |
| 2022/0057604 A1 | 2/2022 | Son et al. | |
| 2022/0066145 A1 | 3/2022 | Liao et al. | |
| 2022/0196982 A1 | 6/2022 | Tokuno et al. | |

FOREIGN PATENT DOCUMENTS

| | | |
|---|---|---|
| CN | 113900236 A | 1/2022 |
| CN | 113985568 A | 1/2022 |
| CN | 113985575 A | 1/2022 |
| KR | 10-2021-0088187 A | 7/2021 |
| TW | 202131049 A | 8/2021 |
| TW | 202142913 A | 11/2021 |
| TW | 202144847 A | 12/2021 |
| TW | 202208925 A | 3/2022 |
| TW | 202208928 A | 3/2022 |
| TW | 202210901 A | 3/2022 |

OTHER PUBLICATIONS

Taiwanese Office Action issued on Aug. 22, 2024, in counterpart Taiwanese Patent Application No. 113125412 (6 pages in English, 5 pages in Chinese).

Chinese Office Action issued on Jan. 23, 2025 in corresponding Chinese Patent Application No. 202211143241.2. (6pages in English, 12pages in Chinese).

Taiwanese Office Action issued on May 19, 2023, in counterpart Taiwanese Patent Application No. 111127030 (7 pages in English, 6 pages in Chinese).

Korean Office Action issued on Jul. 3, 2024 in corresponding Korean Patent Application No. 10-2022-0038054. (8 pages in English and 6 pages in Korean).

Taiwanese Office Action issued on Mar. 13, 2025, in corresponding Taiwanese Patent Application No. 113125412. (8pages in English, 7pages in Taiwanese).

Taiwanese Office Action Issued on Aug. 8, 2025, in Counterpart Taiwanese Patent Application No. 113125412 (10 Pages in English, 8 Pages in Chinese).

Korean Office Action issued on Nov. 20, 2025, in corresponding Korean Patent Application No. 10-2022-0038054. (5 pages in English, 4 pages in Korean).

* cited by examiner

IMAGING LENS SYSTEM

CROSS-REFERENCE TO RELATED APPLICATIONS

This application claims the benefit under 35 USC § 119(a) of Korean Patent Application No. 10-2022-0038054, filed on Mar. 28, 2022, in the Korean Intellectual Property Office, the entire disclosure of which is incorporated herein by reference for all purposes.

BACKGROUND

1. Field

The following description relates to an imaging lens system.

2. Description of Related Art

A portable electronic device may include a camera module or device that captures images or videos. In an example, the camera module may be mounted in a mobile phone, a notebook computer, a game machine, or the like, as non-limited examples.

Resolution and resolving power of the camera module and resolution and resolving power of the imaging lens system may be proportional to a size of a sensor and a size of an imaging plane. In an example, in order to implement a camera module and an imaging lens system, having high resolution, a sensor and an imaging plane having a considerable size may be necessary. However, since a size (or a length) of the camera module and the imaging lens system increases in proportion to the size of the sensor and the size of the imaging plane, it may be difficult to mount such a camera module and imaging lens system, having high resolution, in a thin electronic device such as a smartphone or the like.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, an imaging lens system includes a first lens having a concave object-side surface; a second lens having positive refractive power; a third lens having a refractive power; a fourth lens having a refractive power; a fifth lens having a refractive power; a sixth lens having an Abbe number that is greater than 20 and less than 40; and a seventh lens having a refractive power, wherein the first to seventh lenses are sequentially arranged from an object-side to an imaging side, and wherein the imaging lens system satisfies the following conditional expressions: TTL/(ImgHT*2)<0.8, and 100°<FOV, where TTL is a distance from the object-side surface of the first lens to an imaging plane, ImgHT is a height of the imaging plane, and FOV is an angle of view of the imaging lens system.

The second lens may have a convex object-side surface.
The third lens may have a convex object-side surface.
The fourth lens may have a concave object-side surface.
The fifth lens may have a convex object-side surface.
The sixth lens may have a convex object-side surface.
The seventh lens may have a concave object-side surface.

The imaging lens system may satisfy the following conditional expression: SumD/SumT<0.9, where SumD is a sum of air gaps between the first lens to the seventh lens, and SumT is a sum of thicknesses of each of the first lens to the seventh lens.

The imaging lens system may satisfy the following conditional expression: 0.38<Yc72/L72ER, where Yc72 is a shortest distance from a point closest to the imaging plane on an image-side surface of the seventh lens to an optical axis, and L72ER is an effective radius of an image-side surface of the seventh lens.

In a general aspect, an imaging system includes a first lens having negative refractive power; a second lens having positive refractive power; a third lens having a convex object-side surface; a fourth lens having a concave object-side surface; a fifth lens having positive refractive power; a sixth lens having a convex object-side surface; and a seventh lens having a refractive power, wherein the first to seventh lenses are sequentially arranged from an object-side to an imaging side, and wherein the imaging lens system satisfies the following conditional expressions: 2.8<(V5+V7)/V6<4.8, and 0.62<TTL/(ImgHT*2)<0.72, where V5 is an Abbe number of the fifth lens, V6 is an Abbe number of the sixth lens, V7 is an Abbe number of the seventh lens, TTL is a distance from an object-side surface of the first lens to an imaging plane, and ImgHT is a height of the imaging plane.

The first lens may have a concave object-side surface.
The second lens may have a convex object-side surface.
The fifth lens may have a concave object-side surface.
The seventh lens may have a convex object-side surface.

The imaging lens system may satisfy the following conditional expression: −2.0<f6/f<6.0, where f is a focal length of the imaging lens system, and f6 is a focal length of the sixth lens.

The imaging lens system may satisfy the following conditional expression: 0.4<|f1/f2|<1.5, where f1 is a focal length of the first lens, and f2 is a focal length of the second lens.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
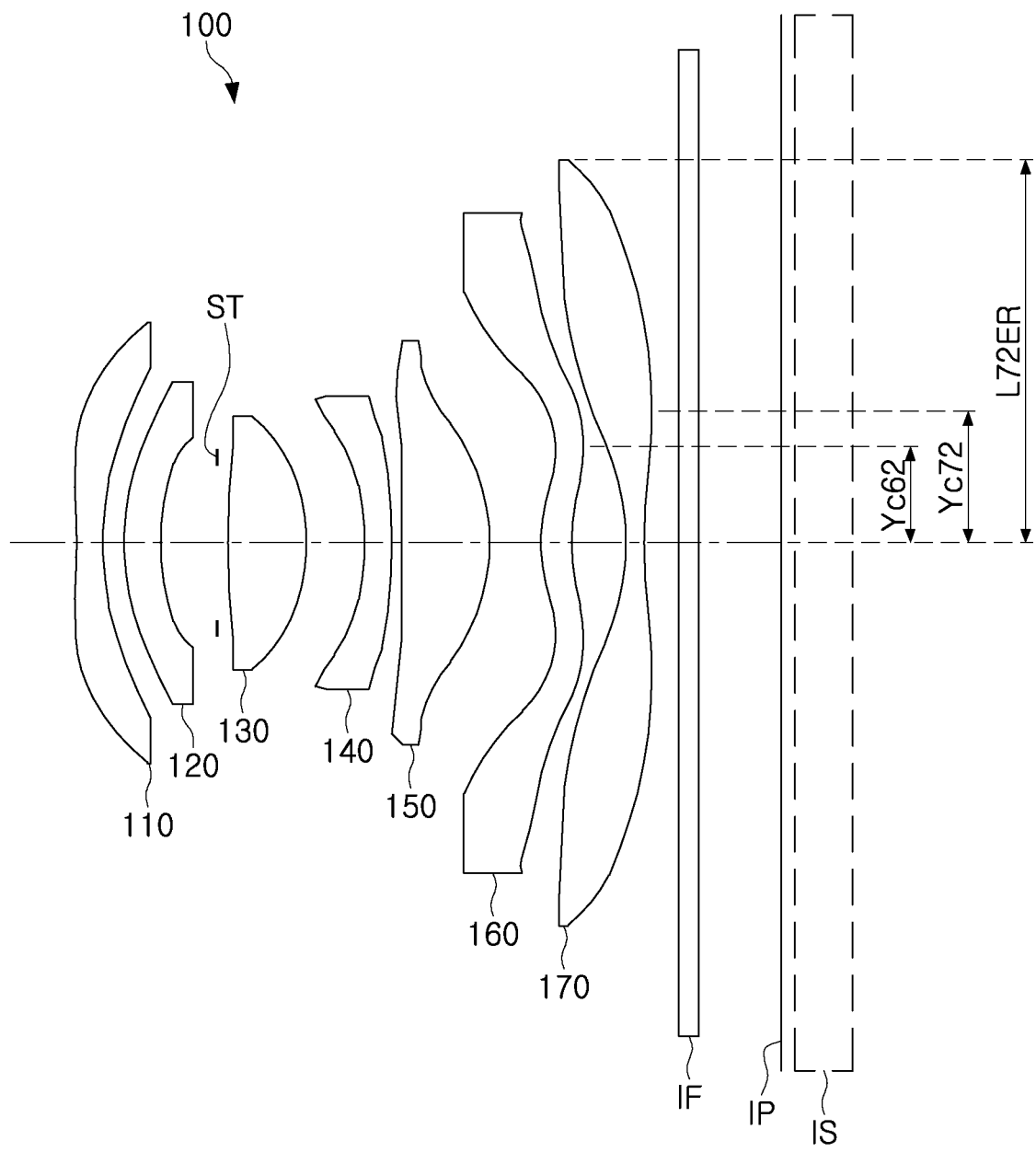
FIG. 1 illustrates a configuration diagram of an example imaging lens system, in accordance with a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In a non-limited example, the example imaging lens system may be mountable in a portable electronic device.

In the one or more examples, a first lens refers to a lens that is most adjacent to an object (or a subject), and a seventh lens refers to a lens most adjacent to an imaging plane (or an image sensor). In the one or more examples, units of a radius of curvature, a thickness, a TTL (a distance from an object-side surface of the first lens to an imaging plane), an ImgHT (a height of the imaging plane), a focal length, and an effective diameter of a lens are indicated in millimeters (mm).

A thickness of a lens, a distance between lenses, and a TTL refer to a distance of a lens along an optical axis of an imaging lens system. Additionally, in the descriptions of a shape of a lens, a configuration in which one surface is convex indicates that a paraxial region of the surface is convex, and a configuration in which one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

An imaging lens system described in the one or more examples may be configured to be mounted on a portable electronic device. In an example, an imaging lens system according to the one or more examples may be mounted on at least one of a camera module disposed in a front portion or a rear portion of a smartphone, as a non-limited example. As another example, an imaging lens system, in accordance with one or more examples, may be mounted on a notebook computer, an augmented reality device, a virtual reality device (VR), a portable game machine, or the like, as non-limited examples. Ranges and examples of implementation of an example imaging lens system are not limited to the above-described electronic device. In an example, the imaging lens system may provide a narrow mounting space, but may be applied to an electronic device where high-resolution imaging is desired.

An imaging lens system, in accordance with a first example, may include a plurality of lenses. For example, the imaging lens system may include a first lens, a second lens, a third lens, a fourth lens, a fifth lens, a sixth lens, and a seventh lens, sequentially arranged from an object-side to an imaging side.

An imaging lens system according to the first example may include a lens having a concave object-side surface. For example, in an imaging lens system according to the first example, the first lens may have a concave object-side surface. An imaging lens system according to the first example may include a lens having positive refractive power. For example, in an imaging lens system according to the first example, the second lens may have positive refractive power. An imaging lens system according to the first example may include a lens having an Abbe number of a specific magnitude. For example, an imaging lens system according to the first example may include a lens having an Abbe number greater than 20 and less than 40. As a specific example, in an imaging lens system according to the first example, the Abbe number of the sixth lens may be greater than 20 and less than 40. The imaging lens system according to the first example may be configured to satisfy a predetermined conditional expression. For example, an imaging lens system according to the first example may satisfy the conditional expressions TTL/(ImgHT*2)<0.8 and 100°<FOV. For reference, in the above conditional expression, TTL is a distance from the object-side surface of the first lens to an imaging plane, ImgHT is a height of the imaging plane, and FOV is an angle of view of the imaging lens system.

An imaging lens system according to a second example may include a plurality of lenses. For example, the imaging lens system may include a first lens, a second lens, a third lens, a fourth lens, a fifth lens, a sixth lens, and a seventh lens, sequentially arranged from an object-side to an imaging side. An imaging lens system according to the second example may include a lens having negative refractive power. For example, in an imaging lens system according to the second example, the first lens may have negative refractive power. An imaging lens system according to the second example may include a lens having positive refractive power. For example, in an imaging lens system according to the second example, the second lens and the fifth lens may have positive refractive power, respectively. An imaging lens system according to the second example may include a lens having a convex object-side surface. For example, in an imaging lens system according to the second example, each of the third lens and the sixth lens may have a convex object-side surface. An imaging lens system according to the second example may include a lens having a concave object-side surface. For example, in an imaging lens system according to the second example, the fourth lens may have a concave object-side surface. An imaging lens system according to the second example may be configured to satisfy a predetermined conditional expression. For example, an imaging lens system according to the second example may satisfy the conditional expressions 2.8<(V5+V7)/V6<4.8 and 0.62<TTL/(ImgHT*2)<0.72. For reference, in the above conditional expression, V5 is an Abbe number of the fifth lens, V6 is an Abbe number of the sixth lens, V7 is an Abbe number of the seventh lens, TTL is a distance from an object-side surface of the first lens to an imaging plane, and ImgHT is a height of the imaging plane.

An imaging lens system according to a third example may satisfy one or more of the following conditional expressions. However, only an imaging lens system according to the third example does not satisfy the following conditional expression. For example, the imaging lens systems according to the first example and the second example may satisfy one or more of the following conditional expressions:

$SumD/SumT<0.9$ $0.38<Yc72/L72ER$ $-2.0<f6/f<6.0$ $0.4<|f1/f2|<1.5$ $TTL/f<2.5$

In the above conditional expression, SumD is a sum of air gaps between the first lens to the seventh lens, SumT is a sum of thicknesses of the first lens to the seventh lens, Yc72 is the shortest distance from a point closest to the imaging plane on an image-side surface of the seventh lens to an optical axis, L72ER is an effective radius of the image-side surface of the seventh lens, f is a focal length of the imaging lens system, f1 is a focal length of the first lens, f2 is a focal length of the second lens, f6 is a focal length of the sixth lens, and TTL is a distance from the object-side surface of the first lens to the imaging plane.

An imaging lens system according to the fourth example may satisfy one or more of the following conditional expressions. However, only an imaging lens system according to the fourth example does not satisfy the following conditional expression. For example, the imaging lens systems according to the first to third examples may satisfy one or more of the following conditional expressions:

$0.30<SumD/SumT<0.90$ $1.8<TTL/f<2.5$ $0.8<f3/f<1.4$ $-5.0<f4/f<-1.0$ $0.4<f5/f<1.4$ $-15<f7/f<-1.0$ $0.2<BFL/f<0.5$ $100<FOV<130$

In the above conditional expression, f3 is a focal length of the third lens, f4 is a focal length of the fourth lens, f5 is a focal length of the fifth lens, f7 is a focal length of the seventh lens, and BFL is a distance from an image-side surface of the seventh lens to the imaging plane.

An example imaging lens system may include one or more lenses having the following characteristics, as necessary. For example, an imaging lens system according to the first to fourth examples may include one of the first to seventh lenses according to the following characteristics. As another example, an imaging lens system according to the first to fourth examples may include two or more of the first to seventh lenses according to the following characteristics. An example imaging lens system according to the above-described example may not necessarily include a lens according to the following characteristics. Hereinafter, characteristics of the first to seventh lenses will be described.

In an example, the first lens may have refractive power. The first lens may have a shape in which one surface is concave. For example, the first lens may have a concave object-side surface. The first lens may include a spherical surface or an aspherical surface. For example, both surfaces of the first lens may be aspherical. The first lens may be formed of a material having high light transmittance and excellent workability. For example, the first lens may be formed of a plastic material or a glass material. The first lens may be configured to have a predetermined refractive index. For example, a refractive index of the first lens may be less than 1.6. As a specific example, the refractive index of the first lens may be greater than 1.52 and less than 1.56. The first lens may have a predetermined Abbe number. For example, the Abbe number of the first lens may be 50 or more. As a specific example, the Abbe number of the first lens may be greater than 53 and less than 58.

In an example, the second lens may have refractive power. The second lens may have a shape in which one surface is convex. For example, the second lens may have a convex object-side surface. The second lens may include a spherical surface or an aspherical surface. For example, both surfaces of the second lens may be aspherical. The second lens may be formed of a material having high light transmittance and excellent workability. For example, the second lens may be formed of a plastic material or a glass material. The second lens may be configured to have a predetermined refractive index. For example, a refractive index of the second lens may be greater than 1.5. As a specific example, the refractive index of the second lens may be greater than 1.54 and less than 1.64. The second lens may have a predetermined Abbe number. For example, the Abbe number of the second lens may be 20 or more. As a specific example, the Abbe number of the second lens may be greater than 20 and less than 60.

In an example, the third lens may have refractive power. The third lens may have a shape in which one surface is convex. For example, the third lens may have a convex object-side surface. The third lens may include a spherical surface or an aspherical surface. For example, both surfaces of the third lens may be aspherical. The third lens may be formed of a material having high light transmittance and excellent workability. For example, the third lens may be formed of a plastic material or a glass material. The third lens may be configured to have a predetermined refractive index. For example, a refractive index of the third lens may be greater than 1.5. As a specific example, the refractive index of the third lens may be greater than 1.52 and less than 1.56. The third lens may have a predetermined Abbe number. For example, the Abbe number of the third lens may be 50 or more. As a specific example, the Abbe number of the third lens may be greater than 53 and less than 58.

In an example, the fourth lens may have refractive power. The fourth lens may have a shape in which one surface is concave. For example, the fourth lens may have a concave object-side surface. The fourth lens may include a spherical surface or an aspherical surface. For example, both surfaces of the fourth lens may be aspherical. The fourth lens may be formed of a material having high light transmittance and excellent workability. For example, the fourth lens may be formed of a plastic material or a glass material. The fourth lens may be configured to have a predetermined refractive index. For example, a refractive index of the fourth lens may be greater than 1.6. As a specific example, the refractive index of the fourth lens may be greater than 1.65 and less than 1.70. The fourth lens may have a predetermined Abbe number. For example, the Abbe number of the fourth lens may be less than 24. As a specific example, the Abbe number of the fourth lens may be greater than 16 and less than 24.

In an example, the fifth lens may have refractive power. The fifth lens may have a shape in which one surface is convex. For example, the fifth lens may have a convex object-side surface. However, the object-side surface of the fifth lens may not be necessarily convex. For example, the object-side surface of the fifth lens may be concave. The fifth lens may include a spherical surface or an aspherical surface. For example, both surfaces of the fifth lens may be aspherical. The fifth lens may be formed of a material having high light transmittance and excellent workability. For example, the fifth lens may be formed of a plastic material or a glass material. The fifth lens may be configured to have a predetermined refractive index. For example, a refractive index of the fifth lens may be greater than 1.5. As a specific example, the refractive index of the fifth lens may be greater than 1.52 and less than 1.60. The fifth lens may have a predetermined Abbe number. For example, the Abbe number of the fifth lens may be greater than 50. As a specific example, the Abbe number of the fifth lens may be greater than 52 and less than 60.

In an example, the sixth lens may have refractive power. The sixth lens may have a shape in which one surface is convex. For example, the sixth lens may have a convex object-side surface. The sixth lens may include a spherical surface or an aspherical surface. For example, both surfaces of the sixth lens may be aspherical. An inflection point may be formed on one or both surfaces of the sixth lens. For example, an inflection point may be formed on an object-side surface and an image-side surface of the sixth lens. The sixth lens may be formed of a material having high light transmittance and excellent workability. For example, the sixth lens may be formed of a plastic material or a glass material. The sixth lens may be configured to have a predetermined refractive index. For example, a refractive index of the sixth lens may be greater than 1.5. As a specific example, the refractive index of the sixth lens may be greater than 1.54 and less than 1.65. The sixth lens may have a predetermined Abbe number. For example, the Abbe number of the sixth lens may be greater than 20. As a specific example, the Abbe number of the sixth lens may be greater than 20 and less than 40.

In an example, the seventh lens may have refractive power. The seventh lens may have a shape in which one surface is concave. For example, the seventh lens may have a concave object-side surface. However, the object-side surface of the seventh lens may not necessarily be concave. For example, the object-side surface of the seventh lens may be convex. The seventh lens may include a spherical surface or an aspherical surface. For example, both surfaces of the seventh lens may be aspherical. An inflection point may be formed on one or both surfaces of the seventh lens. For example, an inflection point may be formed on an object-side surface and an image-side surface of the seventh lens. The seventh lens may be formed of a material having high light transmittance and excellent workability. For example, the seventh lens may be formed of a plastic material or a glass material. The seventh lens may be configured to have a predetermined refractive index. For example, a refractive index of the seventh lens may be greater than 1.5. As a specific example, the refractive index of the seventh lens may be greater than 1.52 and less than 1.57. The seventh lens may have a predetermined Abbe number. For example, the Abbe number of the seventh lens may be greater than 60. As a specific example, the Abbe number of the seventh lens may be greater than 60 and less than 70.

The first to seventh lenses may include a spherical surface or an aspherical surface, as described above. When the first to seventh lenses include an aspherical surface, the aspherical surface of the corresponding lens may be expressed by Equation 1 below:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \ldots \quad \text{Equation 1}$$

In Equation 1, c is the reciprocal of a radius of curvature of a corresponding lens, k is a conic constant, r is a distance from any point on the aspherical surface to an optical axis, A to J are aspherical surface constants, and Z (or SAG) is a height in an optical axis direction from a certain point on the aspherical surface to a vertex of the corresponding aspherical surface.

An imaging lens system according to the above-described embodiment or the above-described example may further include a stop and a filter. In an example, the imaging lens system may further include a stop disposed between the second lens and the third lens. In an example, the imaging lens system may further include a filter disposed between the seventh lens and the imaging plane. The stop may be configured to adjust an amount of light incident in an imaging plane direction, and the filter may be configured to block light of a specific wavelength. For reference, the filter described in the one or more examples may be configured to block infrared light, but light of a wavelength to be blocked through the filter is not limited to the infrared light.

Hereinafter, one or more examples of the imaging lens system will be described with reference to the drawings.

An example imaging lens system according to a first example will be described with reference to FIG. 1.

Referring to FIG. 1, example imaging lens system 100 may include a first lens 110, a second lens 120, a third lens 130, a fourth lens 140, a fifth lens 150, a sixth lens 160, and a seventh lens 170.

In an example, the first lens 110 may have negative refractive power, and may have a concave object-side surface and a concave image-side surface. The second lens 120 may have positive refractive power, and may have a convex object-side surface and a concave image-side surface. The third lens 130 may have positive refractive power, and may have a convex object-side surface and a convex image-side surface. The fourth lens 140 may have negative refractive power, and may have a concave object-side surface and a convex image-side surface. The fifth lens 150 may have positive refractive power, and may have a convex object-side surface and a convex image-side surface. The sixth lens 160 may have positive refractive power, and may have a convex object-side surface and a concave image-side surface. Additionally, an inflection point may be formed on an object-side surface and an image-side surface of the sixth lens 160. The seventh lens 170 may have negative refractive power, and may have a concave object-side surface and a concave image-side surface. Additionally, an inflection point may be formed on an object-side surface and an image-side surface of the seventh lens 170.

The imaging lens system 100 may further include a filter IF and an imaging plane IP. The filter IF may be disposed between the seventh lens 170 and the imaging plane IP. The imaging plane IP may be formed in a position in which light incident from the first lens 110 to the seventh lens 170 is focused. For example, the imaging plane IP may be formed on one surface of an image sensor IS of a camera module or inside the image sensor IS.

Figure 2:
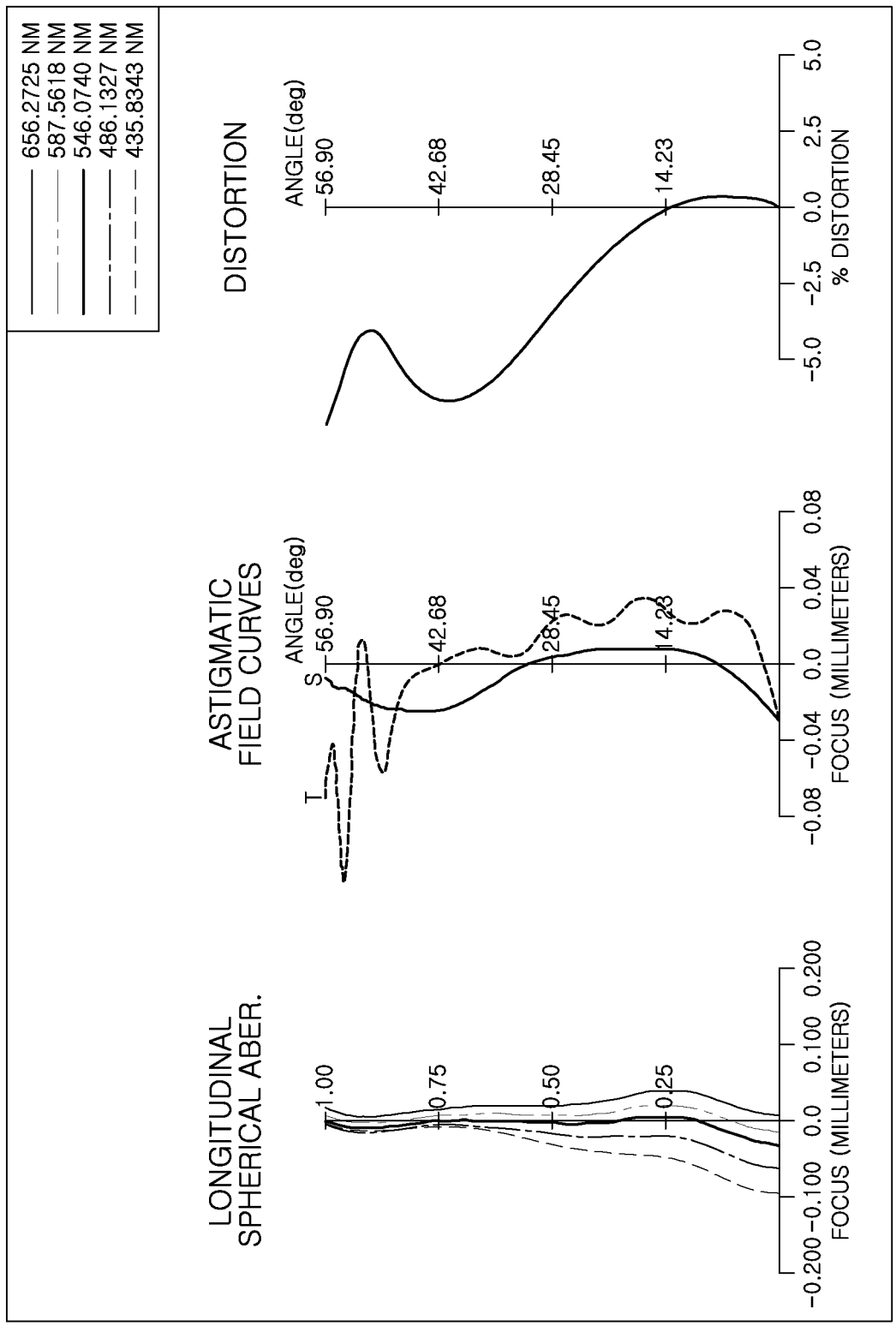
FIG. 2 illustrates an aberration curve of the example imaging lens system illustrated in FIG. 1

The imaging lens system 100 configured as described above may exhibit aberration characteristics illustrated in FIG. 2. Tables 1 and 2 illustrate lens characteristics and aspheric values of an imaging lens system according to the present example.

TABLE 1

| Surface No. | Component | Curvature Radius | Thickness/ Distance | Refractive Index | Abbe No. | Effective Radius |
|---|---|---|---|---|---|---|
| S1 | 1st Lens | −5.7836 | 0.2835 | 1.5441 | 56.1 | 2.1225 |
| S2 | | 6.2372 | 0.2110 | | | 1.8468 |
| S3 | 2nd Lens | 2.2167 | 0.3777 | 1.6144 | 25.9 | 1.5134 |
| S4 | | 3.3683 | 0.5913 | | | 1.0854 |
| S5 | Stop | Infinity | 0.1000 | | | 0.8000 |
| S6 | 3rd Lens | 7.8935 | 0.7994 | 1.5441 | 56.1 | 0.9995 |
| S7 | | −2.6026 | 0.6023 | | | 1.1897 |
| S8 | 4th Lens | −3.7595 | 0.2800 | 1.6707 | 19.2 | 1.3630 |
| S9 | | −16.3450 | 0.1213 | | | 1.8300 |
| S10 | 5th Lens | 1000.00 | 0.9027 | 1.5441 | 56.1 | 1.8424 |
| S11 | | −2.4288 | 0.5205 | | | 2.0300 |
| S12 | 6th Lens | 1.3088 | 0.3105 | 1.6349 | 23.9 | 2.5836 |
| S13 | | 1.3823 | 0.5630 | | | 3.1117 |
| S14 | 7th Lens | −3.5090 | 0.2000 | 1.5350 | 55.7 | 3.6445 |
| S15 | | 6.0000 | 0.3500 | | | 3.8282 |
| S16 | Filter | Infinity | 0.2100 | 1.5168 | 64.2 | 4.5473 |
| S17 | | Infinity | 0.8185 | | | 4.6351 |
| S18 | Imaging Plane | Infinity | 0.0300 | | | 5.2579 |

TABLE 2

| Surface No. | S1 | S2 | S3 | S4 | S6 | S7 | S8 |
|---|---|---|---|---|---|---|---|
| K | −69.2946 | 0.9351 | −1.4589 | 8.2995 | −17.3133 | 3.1905 | 4.0155 |
| A | 0.0982 | 0.0790 | −0.0175 | 0.0958 | 0.0261 | 0.0031 | 0.0403 |
| B | −0.0901 | −0.0787 | −0.2707 | −1.6300 | −0.3771 | −0.3074 | −0.3712 |
| C | 0.1362 | 0.1278 | 1.5136 | 17.3348 | 3.8941 | 2.3312 | −0.6450 |
| D | −0.1860 | −0.1191 | −4.9472 | −119.8855 | −25.9906 | −11.1228 | 9.0898 |
| E | 0.1939 | −0.0171 | 11.1608 | 569.6616 | 117.8256 | 35.8394 | −35.5112 |
| F | −0.1488 | 0.1870 | −18.1488 | −1913.3056 | −377.4550 | −80.8013 | 82.5122 |
| G | 0.0837 | −0.2493 | 21.6131 | 4623.6899 | 872.5646 | 130.0046 | −129.3763 |
| H | −0.0345 | 0.1866 | −18.9556 | −8111.0296 | −1467.7181 | −150.5404 | 142.9319 |
| J | 0.0104 | −0.0908 | 12.2036 | 10325.2523 | 1791.4908 | 125.2756 | −112.7924 |
| I | −0.0022 | 0.0298 | −5.6866 | −9430.8638 | −1564.3247 | −73.9880 | 63.2819 |
| M | 0.0003 | −0.0066 | 1.8629 | 6017.8287 | 948.8225 | 30.1662 | −24.6624 |
| N | 0.0000 | 0.0009 | −0.4063 | −2545.2239 | −378.4344 | −8.0512 | 6.3465 |
| O | 0.0000 | −0.0001 | 0.0529 | 640.7329 | 88.9982 | 1.2630 | −0.9695 |
| P | 0.0000 | 0.0000 | −0.0031 | −72.6356 | −9.3306 | −0.0881 | 0.0666 |

| Surface No. | S9 | S10 | S11 | S12 | S13 | S14 | S15 |
|---|---|---|---|---|---|---|---|
| K | 38.5924 | 99.0000 | −1.1340 | −7.7273 | −6.1489 | −15.9231 | −99.0000 |
| A | 0.2803 | 0.2621 | −0.1299 | −0.0305 | −0.1621 | −0.1333 | −0.0081 |
| B | −1.4046 | −0.9638 | 0.2478 | −0.2097 | 0.0513 | 0.0988 | 0.0001 |
| C | 3.2365 | 1.9426 | −0.4315 | 0.3469 | 0.0302 | −0.0412 | 0.0000 |
| D | −4.6828 | −2.7736 | 0.5595 | −0.3330 | −0.0528 | 0.0113 | 0.0000 |
| E | 3.8766 | 2.8514 | −0.5246 | 0.2112 | 0.0328 | −0.0020 | 0.0000 |
| F | −0.5412 | −2.1143 | 0.3522 | −0.0966 | −0.0118 | 0.0002 | 0.0000 |
| G | −2.9245 | 1.1350 | −0.1694 | 0.0340 | 0.0028 | 0.0000 | 0.0000 |
| H | 4.0735 | −0.4401 | 0.0590 | −0.0094 | −0.0004 | 0.0000 | 0.0000 |
| J | −3.0052 | 0.1214 | −0.0149 | 0.0020 | 0.0001 | 0.0000 | 0.0000 |
| I | 1.4271 | −0.0229 | 0.0027 | −0.0003 | 0.0000 | 0.0000 | 0.0000 |
| M | −0.4500 | 0.0027 | −0.0004 | 0.0000 | 0.0000 | 0.0000 | 0.0000 |
| N | 0.0915 | −0.0002 | 0.0000 | 0.0000 | 0.0000 | 0.0000 | 0.0000 |
| O | −0.0109 | 0.0000 | 0.0000 | 0.0000 | 0.0000 | 0.0000 | 0.0000 |
| P | 0.0006 | 0.0000 | 0.0000 | 0.0000 | 0.0000 | 0.0000 | 0.0000 |

Figure 3:
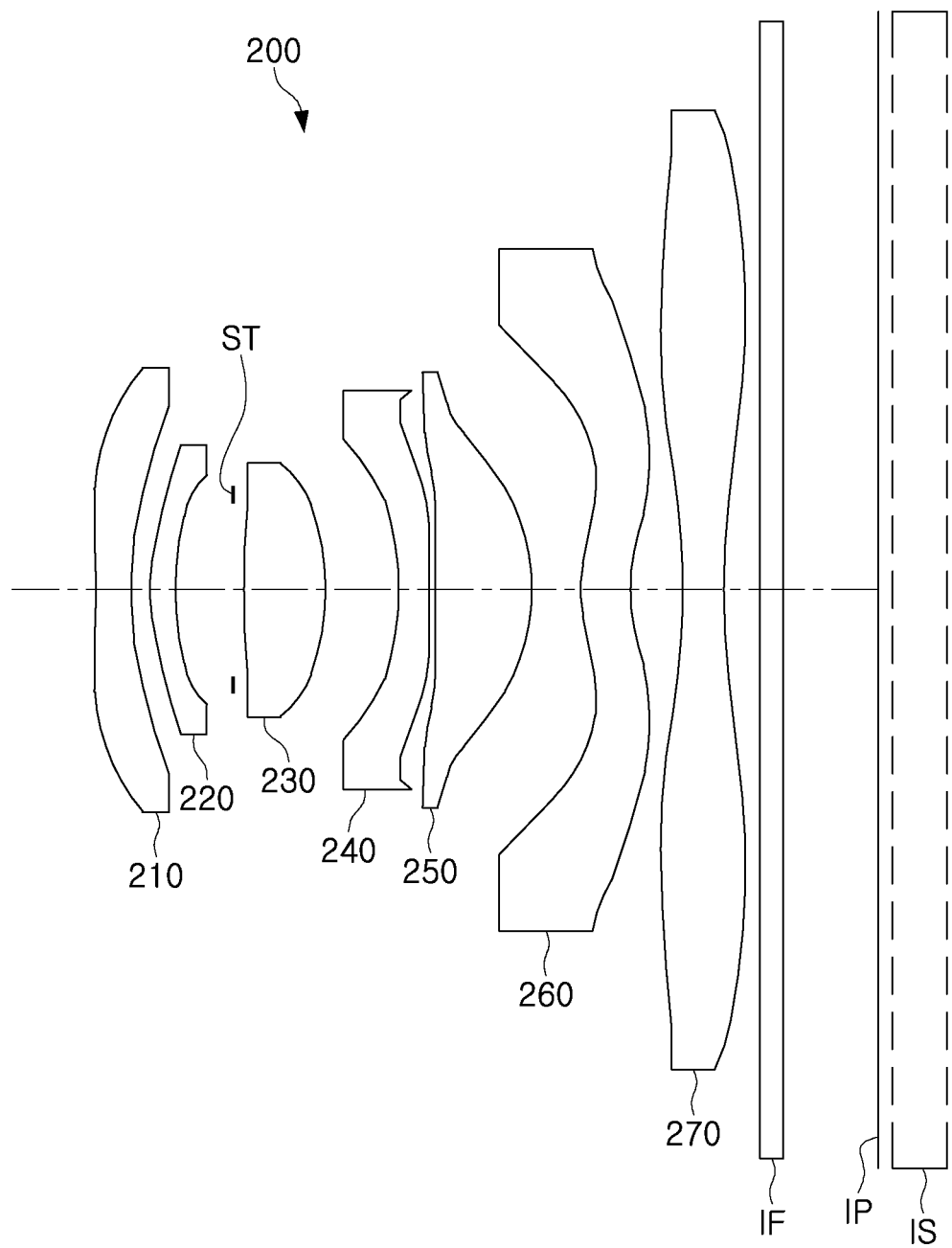
FIG. 3 illustrates a configuration diagram of an example imaging lens system, in accordance with a second example.

An example imaging lens system according to a second example will be described with reference to FIG. 3.

An example imaging lens system 200 may include a first lens 210, a second lens 220, a third lens 230, a fourth lens 240, a fifth lens 250, a sixth lens 260, and a seventh lens 270.

In an example, the first lens 210 may have negative refractive power, and may have a concave object-side surface and a concave image-side surface. The second lens 220 may have positive refractive power, and may have a convex object-side surface and a concave image-side surface. The third lens 230 may have positive refractive power, and may have a convex object-side surface and a convex image-side surface. The fourth lens 240 may have negative refractive power, and may have a concave object-side surface and a convex image-side surface. The fifth lens 250 may have positive refractive power, and may have a concave object-side surface and a convex image-side surface. The sixth lens 260 may have positive refractive power, and may have a convex object-side surface and a concave image-side surface. Additionally, an inflection point may be formed on an object-side surface and an image-side surface of the sixth lens 260. The seventh lens 270 may have negative refractive power, and may have a concave object-side surface and a concave image-side surface. Additionally, an inflection point may be formed on an object-side surface and an image-side surface of the seventh lens 270.

The imaging lens system 200 may further include a filter IF and an imaging plane IP. In an example, the filter IF may be disposed between the seventh lens 270 and the imaging plane IP. The imaging plane IP may be formed in a position in which light incident from the first lens 210 to the seventh lens 270 is focused. For example, the imaging plane IP may be formed on one surface of an image sensor IS of a camera module or inside the image sensor IS.

Figure 4:
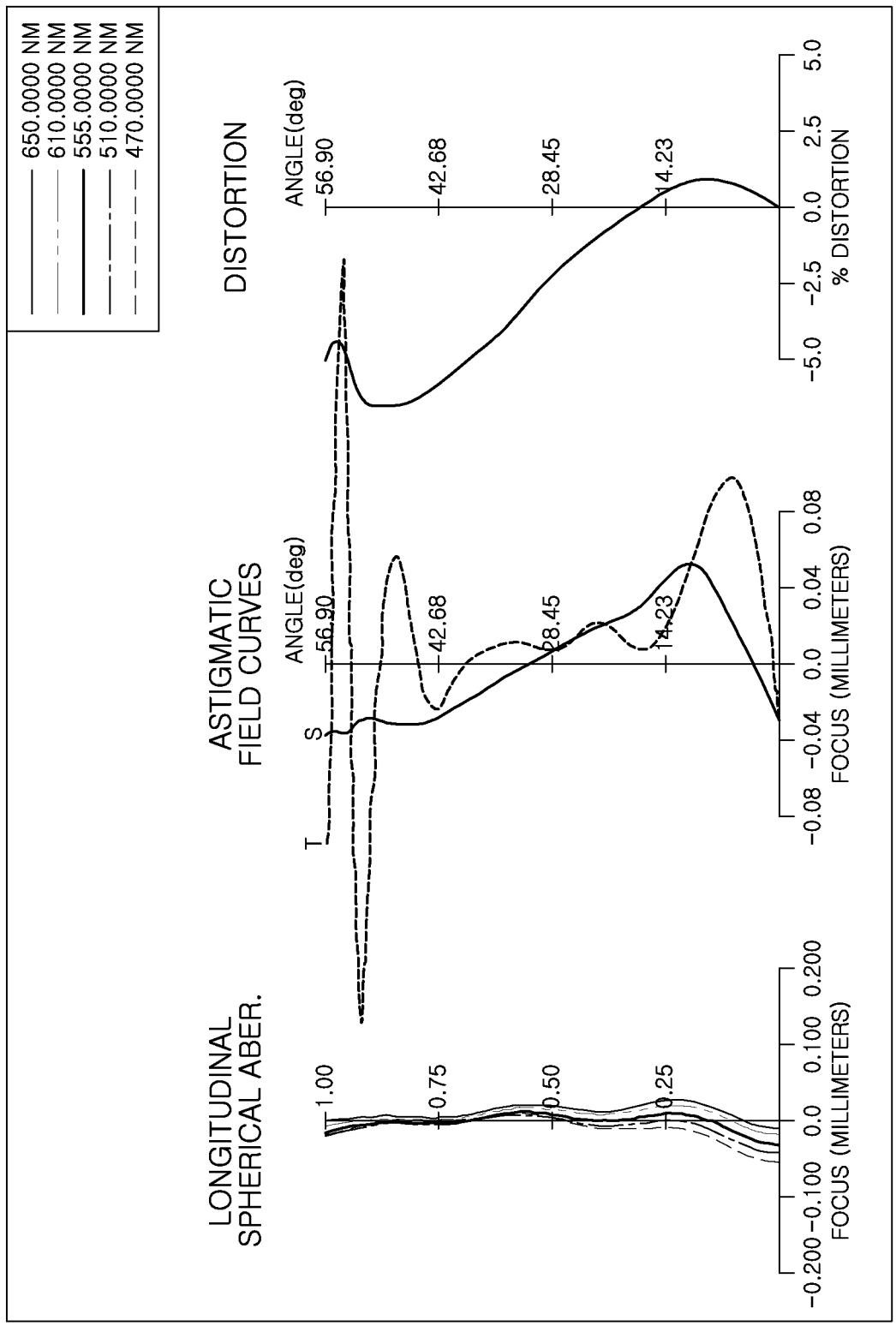
FIG. 4 illustrates an aberration curve of the example imaging lens system illustrated in FIG. 3.

The imaging lens system 200 configured as described above may exhibit aberration characteristics illustrated in FIG. 4. Tables 3 and 4 below illustrate lens characteristics and aspheric values of an imaging lens system according to the present example.

TABLE 3

| Surface No. | Component | Curvature Radius | Thickness/ Distance | Refractive Index | Abbe No. | Effective Radius |
|---|---|---|---|---|---|---|
| S1 | 1st Lens | −5.0652 | 0.3292 | 1.5441 | 56.1 | 2.0400 |
| S2 | | 7.8224 | 0.1770 | | | 1.7290 |
| S3 | 2nd Lens | 2.1774 | 0.2300 | 1.5441 | 56.1 | 1.3336 |
| S4 | | 3.5041 | 0.5260 | | | 1.0633 |
| S5 | Stop | Infinity | 0.1000 | | | 0.8000 |
| S6 | 3rd Lens | 10.1354 | 0.7501 | 1.5441 | 56.1 | 0.9896 |
| S7 | | −2.5867 | 0.6768 | | | 1.1771 |
| S8 | 4th Lens | −3.4908 | 0.2775 | 1.6707 | 19.2 | 1.3831 |

TABLE 3-continued

| Surface No. | Component | Curvature Radius | Thickness/ Distance | Refractive Index | Abbe No. | Effective Radius |
|---|---|---|---|---|---|---|
| S9 | | −12.9494 | 0.0585 | | | 1.8300 |
| S10 | 5th Lens | −14.9636 | 0.8839 | 1.5441 | 56.1 | 1.8683 |
| S11 | | −2.1614 | 0.4452 | | | 2.0000 |
| S12 | 6th Lens | 1.4245 | 0.4517 | 1.6349 | 23.9 | 2.4353 |
| S13 | | 1.4481 | 0.4899 | | | 3.1296 |
| S14 | 7th Lens | −6.3803 | 0.3600 | 1.5350 | 55.7 | 4.1678 |
| S15 | | 4.6486 | 0.3500 | | | 4.3993 |
| S16 | Filter | Infinity | 0.2100 | 1.5168 | 64.2 | 4.6595 |
| S17 | | Infinity | 0.8442 | | | 4.7353 |
| S18 | Imaging Plane | Infinity | 0.0300 | | | 5.2614 |

TABLE 4

| Surface No. | S1 | S2 | S3 | S4 | S6 | S7 | S8 |
|---|---|---|---|---|---|---|---|
| K | −78.3332 | −2.9935 | −2.0260 | 8.6825 | −34.0468 | 3.2586 | 3.9416 |
| A | 0.0912 | 0.1143 | −0.0023 | −0.0956 | −0.0058 | 0.1499 | 0.0243 |
| B | −0.0268 | −0.0396 | −0.8348 | 0.0715 | 0.1536 | −2.1756 | −0.3517 |
| C | −0.0445 | −0.0678 | 6.3209 | 7.6461 | −0.7657 | 16.3552 | −0.4798 |
| D | 0.1157 | 0.2282 | −27.2543 | −88.7376 | −0.3980 | −78.2398 | 8.4642 |
| E | −0.1466 | −0.5872 | 77.5251 | 544.0284 | 22.6730 | 252.4886 | −35.0700 |
| F | 0.1209 | 1.0334 | −154.7608 | −2151.8841 | −127.2656 | −569.8487 | 84.4442 |
| G | −0.0687 | −1.1914 | 223.1808 | 5875.9200 | 395.0963 | 918.9624 | −135.5891 |
| H | 0.0275 | 0.9205 | −235.0556 | −11404.7205 | −798.1125 | −1069.9189 | 152.4008 |
| J | −0.0077 | −0.4862 | 180.4968 | 15883.0820 | 1100.9790 | 899.3798 | −121.9676 |
| I | 0.0015 | 0.1763 | −99.6907 | −15772.7243 | −1046.5920 | −539.6377 | 69.3078 |
| M | −0.0002 | −0.0432 | 38.4774 | 10903.9768 | 673.9801 | 224.9525 | −27.3432 |
| N | 0.0000 | 0.0068 | −9.8301 | −4986.1679 | −280.3691 | −61.7913 | 7.1197 |
| O | 0.0000 | −0.0006 | 1.4910 | 1355.4220 | 67.8617 | 10.0414 | −1.0996 |
| P | 0.0000 | 0.0000 | −0.1015 | −165.7968 | −7.2473 | −0.7304 | 0.0762 |

| Surface No. | S9 | S10 | S11 | S12 | S13 | S14 | S15 |
|---|---|---|---|---|---|---|---|
| K | 49.1829 | −99.0000 | −0.9399 | −7.3326 | −3.8666 | −64.5384 | −43.3537 |
| A | 0.2146 | 0.1690 | −0.1845 | −0.0965 | −0.1439 | −0.0270 | 0.0007 |
| B | −1.0522 | −0.5341 | 0.2218 | −0.0085 | 0.0459 | 0.0150 | −0.0004 |
| C | 2.3464 | 0.8384 | −0.0596 | −0.0093 | 0.0162 | −0.0045 | 0.0000 |
| D | −3.1870 | −0.7463 | −0.2970 | 0.0952 | −0.0315 | 0.0011 | 0.0000 |
| E | 1.9662 | 0.0182 | 0.5941 | −0.1424 | 0.0198 | −0.0003 | 0.0000 |
| F | 1.2629 | 0.8642 | −0.6069 | 0.1101 | −0.0073 | 0.0000 | 0.0000 |
| G | −4.0308 | −1.1677 | 0.3959 | −0.0528 | 0.0018 | 0.0000 | 0.0000 |
| H | 4.3694 | 0.8529 | −0.1743 | 0.0167 | −0.0003 | 0.0000 | 0.0000 |
| J | −2.8767 | −0.4016 | 0.0528 | −0.0036 | 0.0000 | 0.0000 | 0.0000 |
| I | 1.2623 | 0.1275 | −0.0110 | 0.0005 | 0.0000 | 0.0000 | 0.0000 |
| M | −0.3729 | −0.0272 | 0.0016 | 0.0000 | 0.0000 | 0.0000 | 0.0000 |
| N | 0.0715 | 0.0038 | −0.0001 | 0.0000 | 0.0000 | 0.0000 | 0.0000 |
| O | −0.0081 | −0.0003 | 0.0000 | 0.0000 | 0.0000 | 0.0000 | 0.0000 |
| P | 0.0004 | 0.0000 | 0.0000 | 0.0000 | 0.0000 | 0.0000 | 0.0000 |

Figure 5:
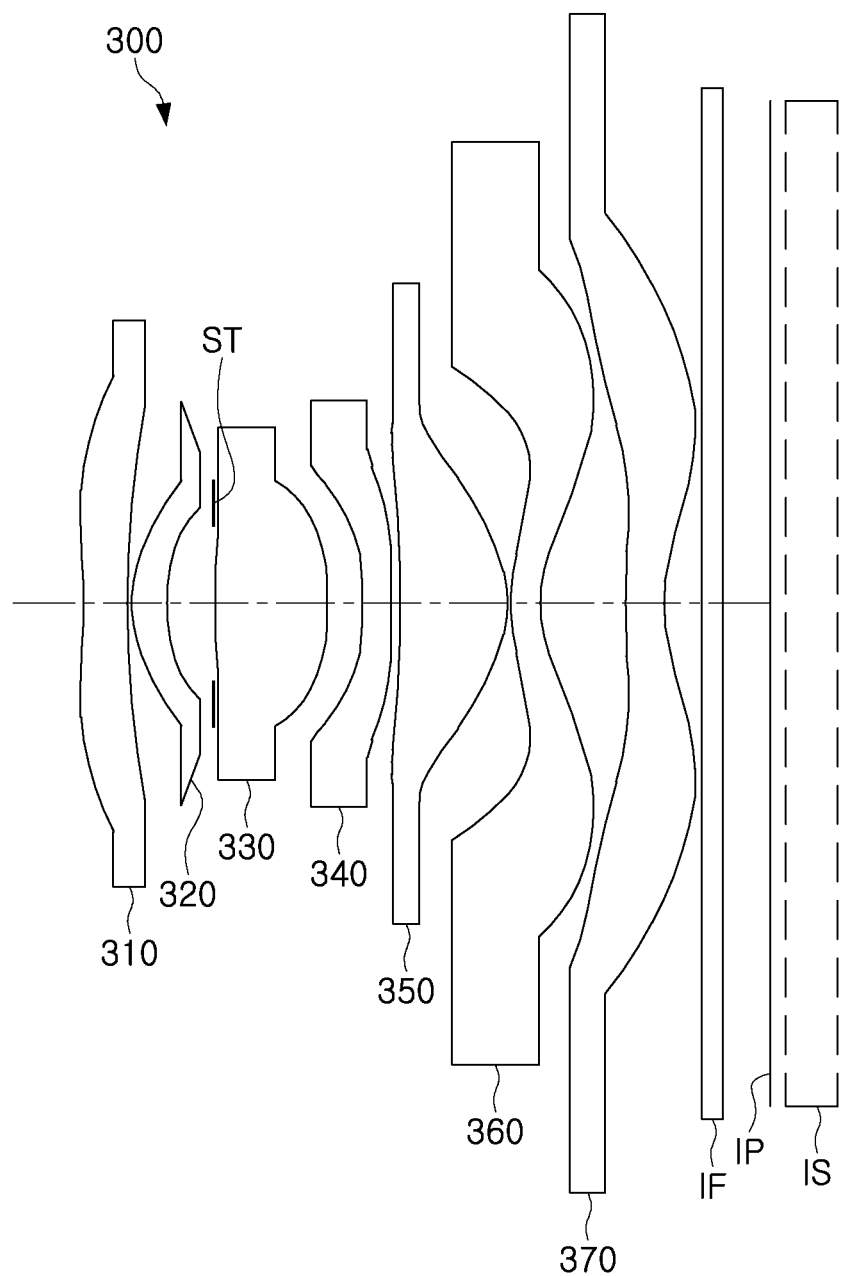
FIG. 5 illustrates a configuration diagram of an example imaging lens system, in accordance with a third example.

An example imaging lens system according to a third example will be described with reference to FIG. 5.

An example imaging lens system 300 may include a first lens 310, a second lens 320, a third lens 330, a fourth lens 340, a fifth lens 350, a sixth lens 360, and a seventh lens 370.

In an example, the first lens 310 may have negative refractive power, and may have a concave object-side surface and a concave image-side surface. The second lens 320 has positive refractive power, and may have a convex object-side surface and a concave image-side surface. The third lens 330 may have positive refractive power, and may have a convex object-side surface and a convex image-side surface. The fourth lens 340 may have negative refractive power, and may have a concave object-side surface and a concave image-side surface. The fifth lens 350 has positive refractive power, and may have a convex object-side surface and a convex image-side surface. The sixth lens 360 may have negative refractive power, and may have a convex object-side surface and a concave image-side surface. Additionally, an inflection point may be formed on an object-side surface and an image-side surface of the sixth lens 360. The seventh lens 370 may have negative refractive power, and may have a convex object-side surface and a concave image-side surface. Additionally, an inflection point may be formed on an object-side surface and an image-side surface of the seventh lens 370.

The imaging lens system 300 may further include a filter IF and an imaging plane IP. The filter IF may be disposed between the seventh lens 370 and the imaging plane IP. The imaging plane IP may be formed in a position in which light incident from the first lens 310 to the seventh lens 370 is focused. For example, the imaging plane IP may be formed on one surface of an image sensor IS of a camera module or inside the image sensor IS.

Figure 6:
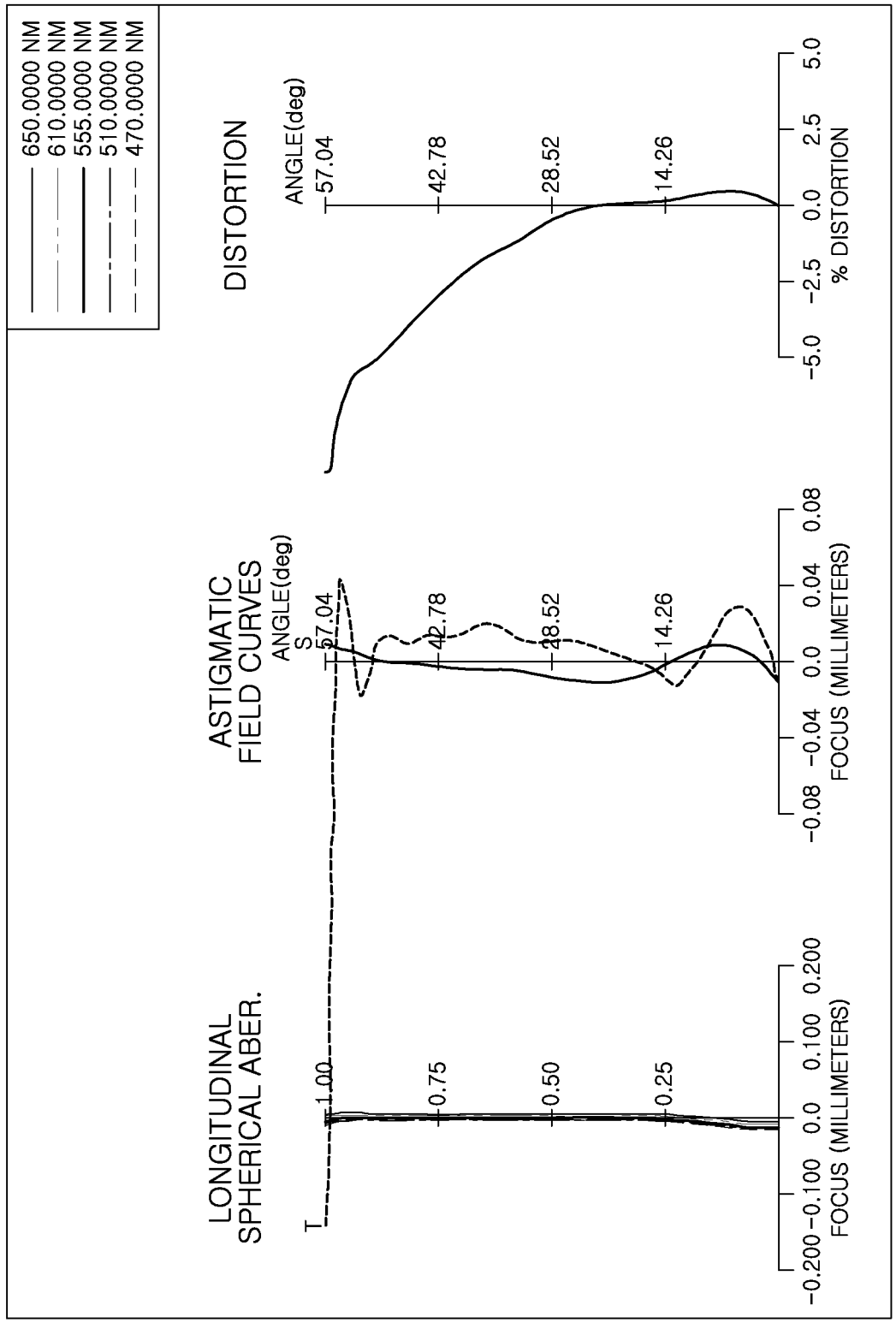
FIG. 6 illustrates an aberration curve of the example imaging lens system illustrated in FIG. 5.

The imaging lens system 300 configured as above may exhibit aberration characteristics illustrated in FIG. 6. Tables 5 and 6 illustrate lens characteristics and aspheric values of an imaging lens system according to the present example.

TABLE 5

| Surface No. | Component | Curvature Radius | Thickness/ Distance | Refractive Index | Abbe No. | Effective Radius |
|---|---|---|---|---|---|---|
| S1 | 1st Lens | −4.8337 | 0.4554 | 1.5458 | 56.0 | 2.4000 |
| S2 | | 30.6701 | 0.0449 | | | 2.1088 |
| S3 | 2nd Lens | 1.4003 | 0.3540 | 1.5458 | 56.0 | 1.2812 |
| S4 | | 1.9027 | 0.4947 | | | 1.0086 |
| S5 | Stop | Infinity | 0.0279 | | | 0.8000 |
| S6 | 3rd Lens | 10.7884 | 1.1581 | 1.5458 | 56.0 | 0.9061 |
| S7 | | −3.2107 | 0.3693 | | | 1.2907 |
| S8 | 4th Lens | −6.8343 | 0.3000 | 1.6769 | 19.2 | 1.4244 |
| S9 | | 17.7745 | 0.0830 | | | 1.6925 |
| S10 | 5th Lens | 114.584 | 1.1243 | 1.5458 | 56.0 | 2.0009 |
| S11 | | −1.3546 | 0.0300 | | | 2.1367 |
| S12 | 6th Lens | 1.9509 | 0.3000 | 1.5699 | 37.4 | 2.4817 |
| S13 | | 1.1684 | 0.8808 | | | 3.4694 |
| S14 | 7th Lens | 3.4150 | 0.4000 | 1.5458 | 56.0 | 3.8074 |
| S15 | | 1.4868 | 0.4066 | | | 4.0650 |
| S16 | Filter | Infinity | 0.2100 | 1.5168 | 64.2 | 4.7802 |
| S17 | | Infinity | 0.4786 | | | 4.8664 |
| S18 | Imaging Plane | Infinity | 0.0114 | | | 5.2272 |

TABLE 6

| Surface No. | S1 | S2 | S3 | S4 | S6 | S7 | S8 |
|---|---|---|---|---|---|---|---|
| K | −60.2046 | 55.3146 | −3.2942 | 1.5474 | −85.7565 | 3.5259 | 12.3795 |
| A | 0.0816 | 0.0932 | 0.0901 | 0.0038 | 0.0059 | −0.0543 | −0.1704 |
| B | −0.0602 | −0.1538 | −0.1325 | 0.0920 | −0.0082 | −0.0763 | 0.3170 |
| C | 0.0413 | 0.1929 | 0.2984 | −0.4114 | 0.0013 | 0.6460 | −1.9970 |
| D | −0.0229 | −0.1954 | −0.6112 | 1.2271 | −0.0111 | −3.4048 | 7.9264 |
| E | 0.0098 | 0.1553 | 0.8422 | −2.7620 | 0.0013 | 11.6070 | −20.3864 |
| F | −0.0031 | −0.0940 | −0.7711 | 4.5465 | 0.0067 | −27.2988 | 35.8266 |
| G | 0.0007 | 0.0428 | 0.4830 | −5.4285 | −0.0050 | 45.8690 | −44.3994 |
| H | −0.0001 | −0.0145 | −0.2108 | 4.7685 | 0.0018 | −55.9388 | 39.5288 |
| J | 0.0000 | 0.0037 | 0.0645 | −3.0819 | −0.0004 | 49.5870 | −25.4321 |
| I | 0.0000 | −0.0007 | −0.0137 | 1.4366 | 0.0001 | −31.5850 | 11.7306 |
| M | 0.0000 | 0.0001 | 0.0020 | −0.4653 | 0.0000 | 14.0635 | −3.7816 |
| N | 0.0000 | 0.0000 | −0.0002 | 0.0986 | 0.0000 | −4.1489 | 0.8083 |
| O | 0.0000 | 0.0000 | 0.0000 | −0.0122 | 0.0000 | 0.7275 | −0.1028 |
| P | 0.0000 | 0.0000 | 0.0000 | 0.0007 | 0.0000 | −0.0573 | 0.0059 |

| Surface No. | S9 | S10 | S11 | S12 | S13 | S14 | S15 |
|---|---|---|---|---|---|---|---|
| K | 99.0000 | 99.0000 | −1.1174 | −19.8893 | −6.6924 | −74.7454 | −8.4635 |
| A | −0.1213 | −0.0112 | 0.0414 | 0.0305 | 0.0441 | −0.0435 | −0.0187 |
| B | −0.0466 | −0.2053 | 0.0520 | −0.0324 | −0.0361 | 0.0109 | 0.0010 |
| C | 0.1526 | 0.6068 | −0.1910 | 0.0093 | 0.0108 | −0.0021 | 0.0000 |
| D | 0.0420 | −0.9216 | 0.3053 | −0.0029 | −0.0015 | 0.0003 | 0.0000 |
| E | −0.5322 | 0.9057 | −0.3079 | 0.0012 | −0.0001 | 0.0000 | 0.0000 |
| F | 0.8929 | −0.6266 | 0.2149 | −0.0005 | 0.0001 | 0.0000 | 0.0000 |
| G | −0.8187 | 0.3171 | −0.1074 | 0.0001 | 0.0000 | 0.0000 | 0.0000 |
| H | 0.4833 | −0.1191 | 0.0388 | 0.0000 | 0.0000 | 0.0000 | 0.0000 |
| J | −0.1939 | 0.0331 | −0.0100 | 0.0000 | 0.0000 | 0.0000 | 0.0000 |
| I | 0.0536 | −0.0067 | 0.0018 | 0.0000 | 0.0000 | 0.0000 | 0.0000 |
| M | −0.0101 | 0.0010 | −0.0002 | 0.0000 | 0.0000 | 0.0000 | 0.0000 |
| N | 0.0012 | −0.0001 | 0.0000 | 0.0000 | 0.0000 | 0.0000 | 0.0000 |
| O | −0.0001 | 0.0000 | 0.0000 | 0.0000 | 0.0000 | 0.0000 | 0.0000 |
| P | 0.0000 | 0.0000 | 0.0000 | 0.0000 | 0.0000 | 0.0000 | 0.0000 |

Figure 7:
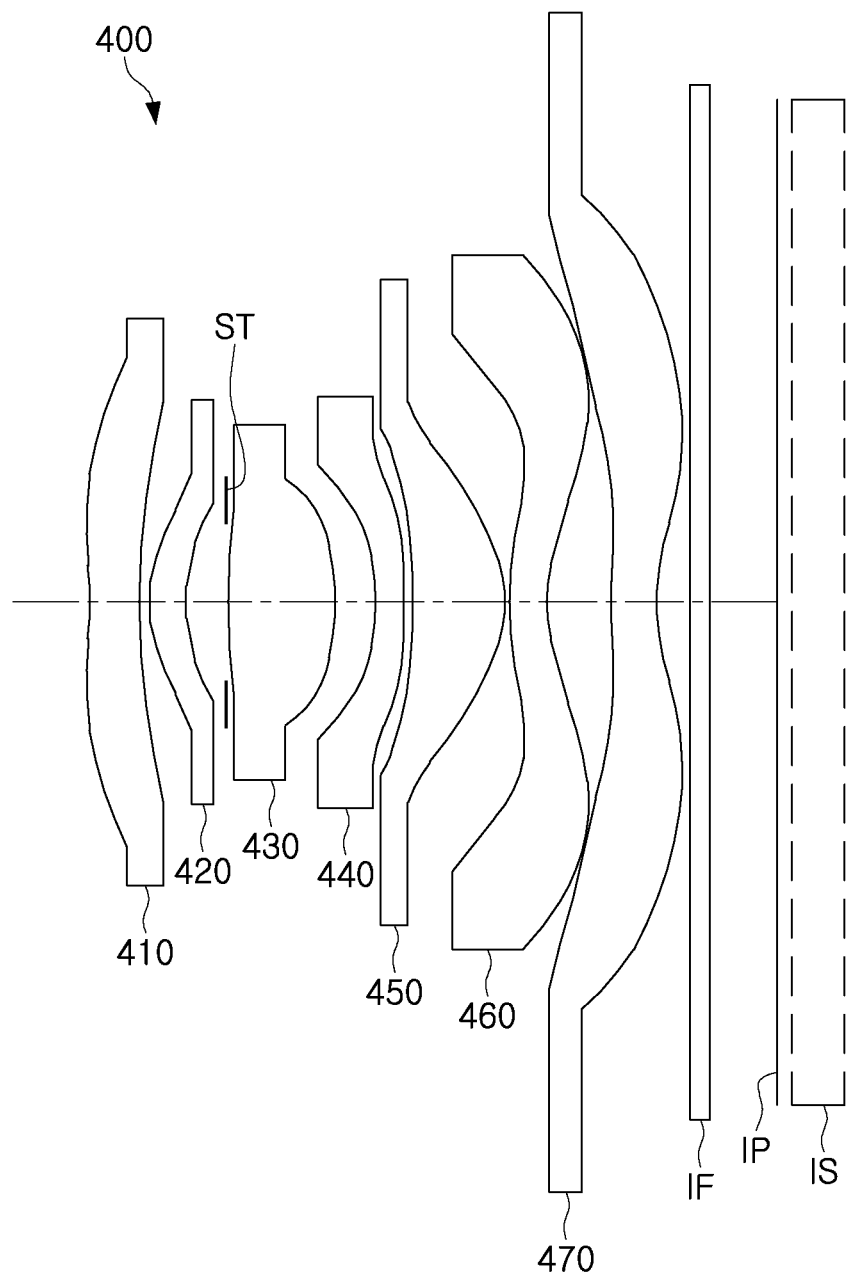
FIG. 7 illustrates a configuration diagram of an example imaging lens system, in accordance with a fourth example.

An example imaging lens system according to a fourth example will be described with reference to FIG. 7.

An example imaging lens system 400 may include a first lens 410, a second lens 420, a third lens 430, a fourth lens 440, a fifth lens 450, a sixth lens 460, and a seventh lens 470.

In an example, the first lens 410 may have negative refractive power, and may have a concave object-side surface and a concave image-side surface. The second lens 420 may have positive refractive power, and may have a convex object-side surface and a concave image-side surface. The third lens 430 may have positive refractive power, and may have a convex object-side surface and a convex image-side surface. The fourth lens 440 may have negative refractive power, and may have a concave object-side surface and a concave image-side surface. The fifth lens 450 may have positive refractive power, and may have a concave object-side surface and a convex image-side surface. The sixth lens 460 may have negative refractive power, and may have a convex object-side surface and a concave image-side surface. Additionally, an inflection point may be formed on an object-side surface and an image-side surface of the sixth lens 460. The seventh lens 470 may have negative refractive power, and may have a convex object-side surface and a concave image-side surface. Additionally, an inflection point may be formed on an object-side surface and an image-side surface of the seventh lens 470.

The imaging lens system 400 may further include a filter IF and an imaging plane IP. The filter IF may be disposed between the seventh lens 470 and the imaging plane IP. The imaging plane IP may be formed in a position in which light incident from the first lens 410 to the seventh lens 470 is focused. For example, the imaging plane IP may be formed on one surface of an image sensor IS of a camera module or inside the image sensor IS.

Figure 8:
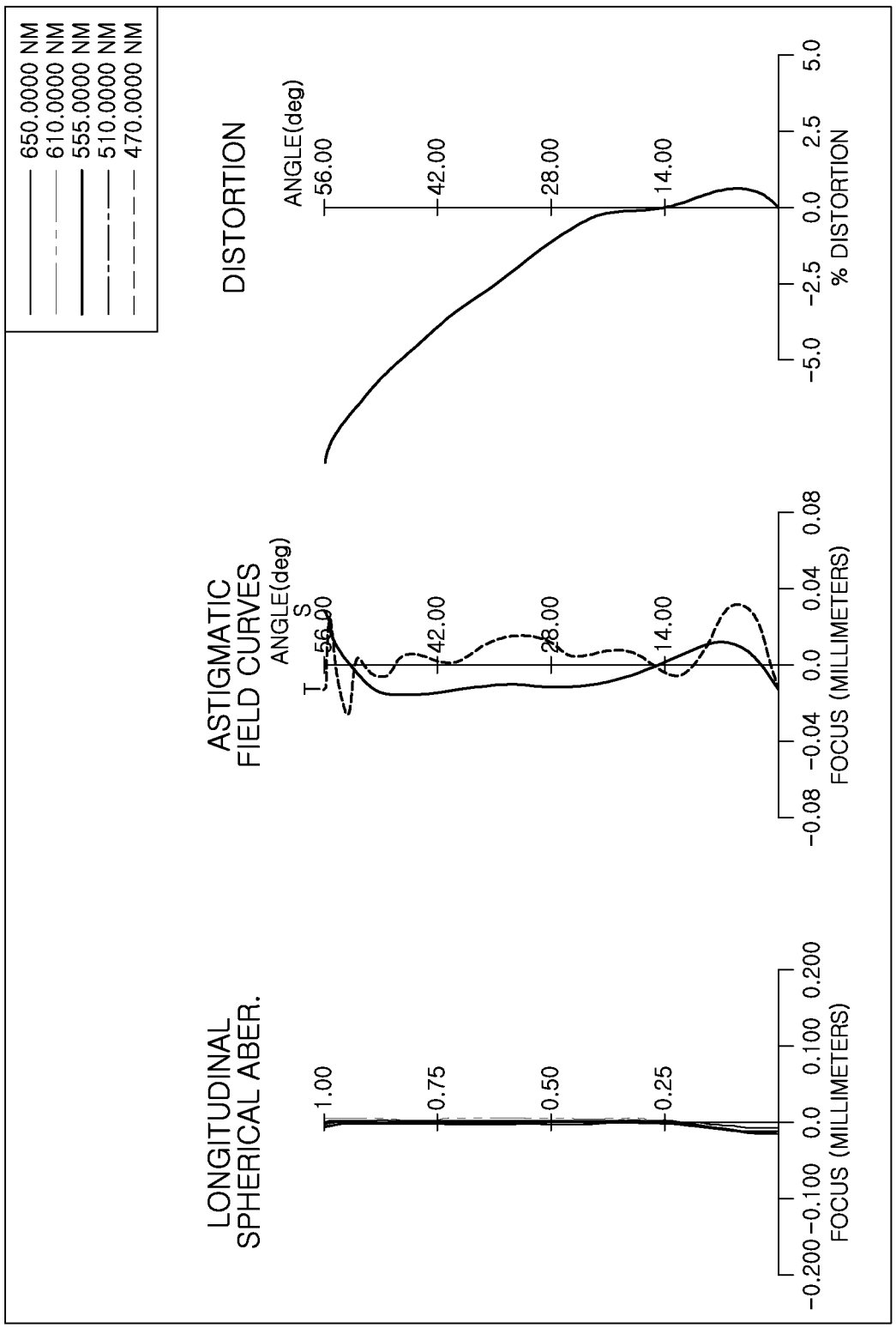
FIG. 8 illustrates an aberration curve of the example imaging lens system illustrated in FIG. 7.

The imaging lens system 400 configured as described above may exhibit aberration characteristics illustrated in FIG. 8. Tables 7 and 8 below illustrate lens characteristics and aspheric values of an imaging lens system according to the present example.

TABLE 7

| Surface No. | Component | Curvature Radius | Thickness/ Distance | Refractive Index | Abbe No. | Effective Radius |
|---|---|---|---|---|---|---|
| S1 | 1st Lens | −4.9318 | 0.5097 | 1.5458 | 56.0 | 2.5500 |
| S2 | | 21.4530 | 0.0945 | | | 2.1730 |
| S3 | 2nd Lens | 1.4788 | 0.3915 | 1.5458 | 56.0 | 1.3343 |
| S4 | | 2.2263 | 0.4156 | | | 1.0267 |
| S5 | Stop | Infinity | 0.0279 | | | 0.8150 |
| S6 | 3rd Lens | 8.8944 | 1.1131 | 1.5458 | 56.0 | 0.9735 |
| S7 | | −2.9169 | 0.4200 | | | 1.3025 |
| S8 | 4th Lens | −4.0175 | 0.2817 | 1.6769 | 19.2 | 1.4363 |
| S9 | | 47.5355 | 0.0937 | | | 1.7311 |
| S10 | 5th Lens | −17.2760 | 0.9636 | 1.5458 | 56.0 | 1.7956 |
| S11 | | −1.2934 | 0.0300 | | | 2.0775 |
| S12 | 6th Lens | 3.1154 | 0.3900 | 1.5699 | 37.4 | 2.7811 |
| S13 | | 1.5843 | 0.6732 | | | 3.6125 |
| S14 | 7th Lens | 3.0857 | 0.4600 | 1.5458 | 56.0 | 4.0155 |
| S15 | | 1.4181 | 0.3642 | | | 4.2400 |
| S16 | Filter | Infinity | 0.2100 | 1.5168 | 64.2 | 4.8172 |
| S17 | | Infinity | 0.6761 | | | 4.8851 |
| S18 | Imaging Plane | Infinity | 0.0139 | | | 5.2569 |

TABLE 8

| Surface No. | S1 | S2 | S3 | S4 | S6 | S7 | S8 |
|---|---|---|---|---|---|---|---|
| K | −59.9009 | 43.9925 | −3.8006 | 2.7003 | 44.5804 | 1.9778 | 4.0515 |
| A | 0.0722 | 0.1433 | 0.1459 | 0.0000 | −0.0062 | −0.0493 | −0.2894 |
| B | −0.0465 | −0.2558 | −0.2686 | −0.0047 | −0.0029 | −0.0874 | 0.8848 |
| C | 0.0284 | 0.3616 | 0.4640 | 0.0064 | −0.0137 | 0.7996 | −3.7181 |
| D | −0.0141 | −0.4175 | −0.7542 | −0.2230 | 0.0150 | −4.0213 | 11.4592 |
| E | 0.0052 | 0.3698 | 0.8294 | 0.2064 | −0.0120 | 12.5494 | −25.6384 |
| F | −0.0014 | −0.2441 | −0.5971 | 0.8577 | 0.0071 | −25.9233 | 43.1046 |
| G | 0.0003 | 0.1191 | 0.2922 | −2.7173 | −0.0028 | 36.3952 | −54.8988 |
| H | 0.0000 | −0.0428 | −0.0998 | 3.7676 | 0.0007 | −34.6942 | 52.6184 |
| J | 0.0000 | 0.0113 | 0.0240 | −3.0895 | −0.0001 | 21.6140 | −37.4218 |
| I | 0.0000 | −0.0021 | −0.0040 | 1.6084 | 0.0000 | −7.7179 | 19.3228 |
| M | 0.0000 | 0.0003 | 0.0005 | −0.5378 | 0.0000 | 0.6704 | −7.0004 |
| N | 0.0000 | 0.0000 | 0.0000 | 0.1120 | 0.0000 | 0.6379 | 1.6796 |
| O | 0.0000 | 0.0000 | 0.0000 | −0.0133 | 0.0000 | −0.2626 | −0.2389 |
| P | 0.0000 | 0.0000 | 0.0000 | 0.0007 | 0.0000 | 0.0330 | 0.0152 |

| Surface No. | S9 | S10 | S11 | S12 | S13 | S14 | S15 |
|---|---|---|---|---|---|---|---|
| K | −98.0709 | 91.1133 | −1.0202 | −42.6696 | −11.2025 | −99.0000 | −10.8419 |
| A | −0.4837 | −0.3583 | 0.0978 | 0.0982 | 0.0425 | −0.0690 | −0.0201 |
| B | 1.7306 | 1.5691 | 0.0124 | −0.1059 | −0.0322 | 0.0277 | 0.0015 |
| C | −4.6741 | −3.8989 | −0.1591 | 0.0519 | 0.0102 | −0.0070 | 0.0000 |

TABLE 8-continued

| | | | | | | | |
|---|---|---|---|---|---|---|---|
| D | 8.1815 | 6.0012 | 0.2603 | −0.0167 | −0.0019 | 0.0012 | 0.0000 |
| E | −9.6118 | −6.1610 | −0.2836 | 0.0036 | 0.0002 | −0.0001 | 0.0000 |
| F | 7.9120 | 4.4163 | 0.2292 | −0.0005 | 0.0000 | 0.0000 | 0.0000 |
| G | −4.6828 | −2.2691 | −0.1348 | 0.0001 | 0.0000 | 0.0000 | 0.0000 |
| H | 2.0151 | 0.8456 | 0.0563 | 0.0000 | 0.0000 | 0.0000 | 0.0000 |
| J | −0.6299 | −0.2285 | −0.0165 | 0.0000 | 0.0000 | 0.0000 | 0.0000 |
| I | 0.1412 | 0.0442 | 0.0033 | 0.0000 | 0.0000 | 0.0000 | 0.0000 |
| M | −0.0221 | −0.0060 | −0.0005 | 0.0000 | 0.0000 | 0.0000 | 0.0000 |
| N | 0.0023 | 0.0005 | 0.0000 | 0.0000 | 0.0000 | 0.0000 | 0.0000 |
| O | −0.0001 | 0.0000 | 0.0000 | 0.0000 | 0.0000 | 0.0000 | 0.0000 |
| P | 0.0000 | 0.0000 | 0.0000 | 0.0000 | 0.0000 | 0.0000 | 0.0000 |

Figure 9:
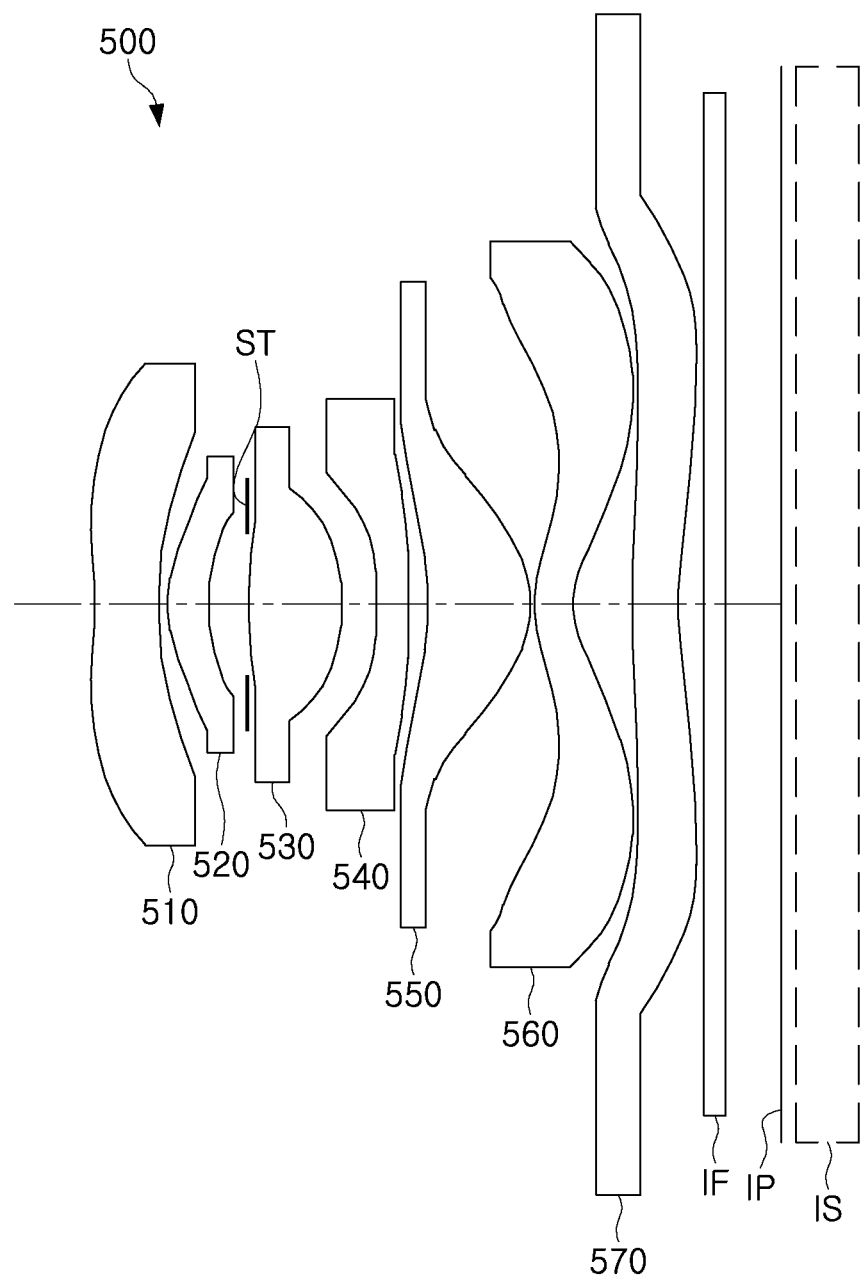
FIG. 9 illustrates a configuration diagram of an example imaging lens system, in accordance with a fifth example.

An example imaging lens system according to a fifth example will be described with reference to FIG. 9.

An example imaging lens system 500 may include a first lens 510, a second lens 520, a third lens 530, a fourth lens 540, a fifth lens 550, a sixth lens 560, and a seventh lens 570.

The first lens 510 may have negative refractive power, and may have a concave object-side surface and a concave image-side surface. The second lens 520 may have positive refractive power, and may have a convex object-side surface and a concave image-side surface. The third lens 530 may have positive refractive power, and may have a convex object-side surface and a convex image-side surface. The fourth lens 540 may have negative refractive power, and may have a concave object-side surface and a concave image-side surface. The fifth lens 550 may have positive refractive power, and may have a concave object-side surface and a convex image-side surface. The sixth lens 560 may have negative refractive power, and may have a convex object-side surface and a concave image-side surface. Additionally, an inflection point may be formed on an object-side surface and an image-side surface of the sixth lens 560. The seventh lens 570 may have negative refractive power, and may have a convex object-side surface and a concave image-side surface. Additionally, an inflection point may be formed on an object-side surface and an image-side surface of the seventh lens 570.

The imaging lens system 500 may further include a filter IF and an imaging plane IP. The filter IF may be disposed between the seventh lens 570 and the imaging plane IP. The imaging plane IP may be formed in a position in which light incident from the first lens 510 to the seventh lens 570 is focused. For example, the imaging plane IP may be formed on one surface of an image sensor IS of a camera module or inside the image sensor IS.

Figure 10:
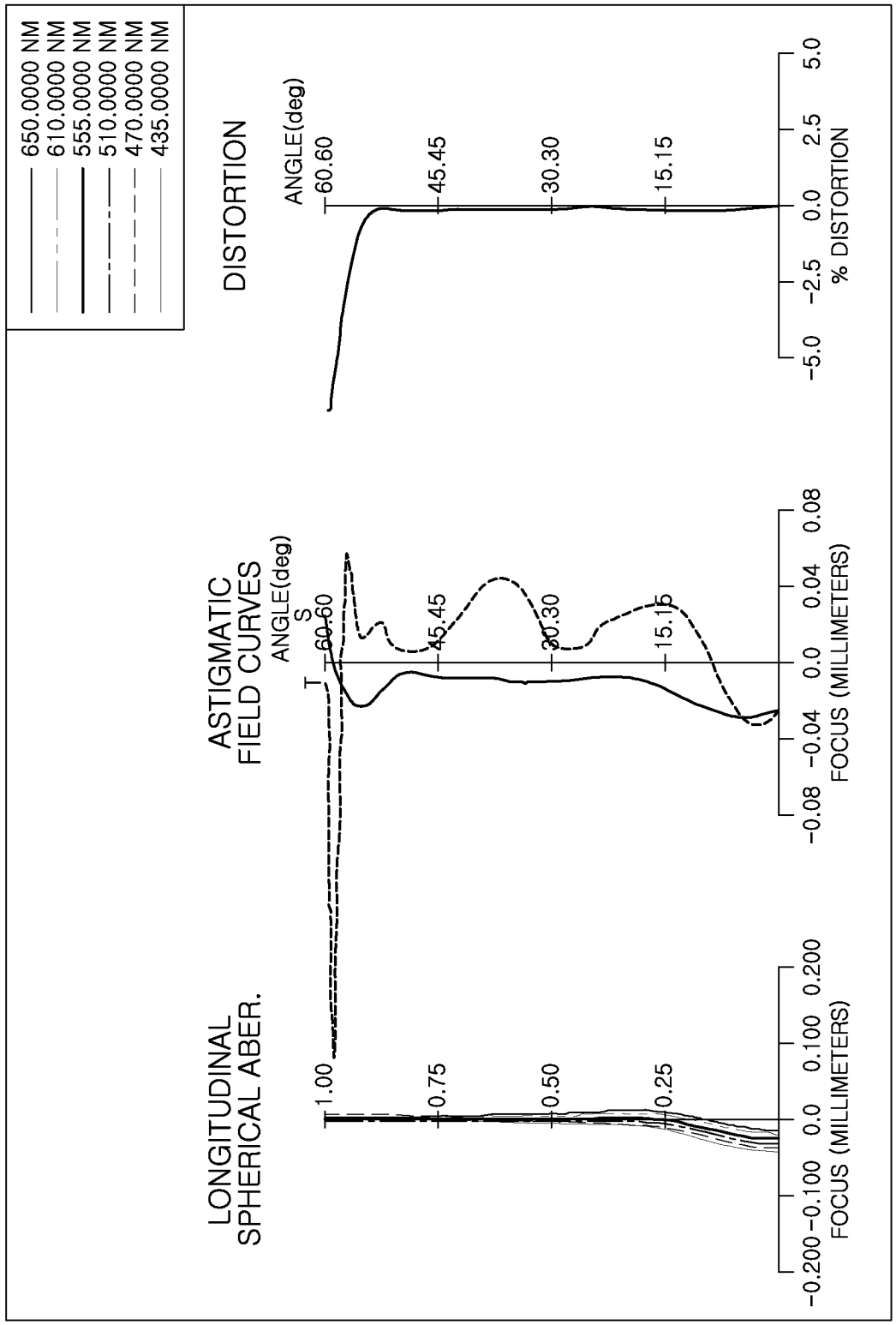
FIG. 10 illustrates an aberration curve of the example imaging lens system illustrated in FIG. 9.

The imaging lens system 500 configured as described above may exhibit aberration characteristics illustrated in FIG. 10. Tables 9 and 10 illustrate lens characteristics and aspheric values of an imaging lens system according to the present example.

TABLE 9

| Surface No. | Component | Curvature Radius | Thickness/ Distance | Refractive Index | Abbe No. | Effective Radius |
|---|---|---|---|---|---|---|
| S1 | 1st Lens | −4.4459 | 0.6723 | 1.5458 | 56.0 | 2.5000 |
| S2 | | 18.0047 | 0.0900 | | | 1.7931 |
| S3 | 2nd Lens | 1.6717 | 0.4210 | 1.5458 | 56.0 | 1.3205 |
| S4 | | 2.2608 | 0.4030 | | | 0.9493 |
| S5 | Stop | Infinity | 0.0279 | | | 0.7300 |
| S6 | 3rd Lens | 6.8028 | 0.9638 | 1.5458 | 56.0 | 0.9362 |
| S7 | | −2.2337 | 0.3480 | | | 1.1953 |
| S8 | 4th Lens | −6.8781 | 0.3300 | 1.6769 | 19.2 | 1.3601 |
| S9 | | 28.3570 | 0.2078 | | | 1.7400 |
| S10 | 5th Lens | −2.8371 | 1.0667 | 1.5458 | 56.0 | 1.8586 |
| S11 | | −1.0509 | 0.0300 | | | 2.1085 |
| S12 | 6th Lens | 1.3886 | 0.4000 | 1.5699 | 37.4 | 3.4000 |
| S13 | | 0.8041 | 0.6163 | | | 3.7643 |
| S14 | 7th Lens | 11.7908 | 0.4800 | 1.5458 | 56.0 | 4.1395 |
| S15 | | 4.3228 | 0.2723 | | | 4.2920 |
| S16 | Filter | Infinity | 0.2100 | 1.5168 | 64.2 | 4.7443 |
| S17 | | Infinity | 0.5650 | | | 4.8274 |
| S18 | Imaging Plane | Infinity | 0.0250 | | | 5.2245 |

TABLE 10

| Surface No. | S1 | S2 | S3 | S4 | S6 | S7 | S8 |
|---|---|---|---|---|---|---|---|
| K | −32.2710 | 95.9661 | −3.9537 | 3.8804 | −32.3967 | 1.3824 | 17.9694 |
| A | 0.0981 | 0.3594 | 0.2888 | 0.0027 | 0.0117 | −0.0229 | −0.1761 |
| B | −0.0739 | −0.8875 | −0.7817 | −0.1281 | −0.0327 | −0.7004 | 0.0257 |
| C | 0.0475 | 1.8045 | 1.3801 | 0.1699 | 0.0639 | 6.3405 | −0.6269 |
| D | −0.0210 | −3.0242 | −1.8439 | 0.1346 | −0.1108 | −36.4497 | 4.3662 |
| E | 0.0049 | 4.0221 | 1.7379 | −1.3565 | 0.0921 | 141.5207 | −16.1414 |
| F | 0.0006 | −4.1454 | −1.1275 | 3.1484 | −0.0442 | −385.5317 | 38.3417 |

TABLE 10-continued

| | | | | | | | |
|---|---|---|---|---|---|---|---|
| G | −0.0010 | 3.2604 | 0.5088 | −4.0468 | 0.0136 | 754.8784 | −62.0017 |
| H | 0.0004 | −1.9346 | −0.1618 | 3.4001 | −0.0029 | −1074.8365 | 70.4037 |
| J | −0.0001 | 0.8552 | 0.0365 | −1.9876 | 0.0004 | 1113.2604 | −56.8856 |
| I | 0.0000 | −0.2764 | −0.0058 | 0.8198 | 0.0000 | −829.0559 | 32.5822 |
| M | 0.0000 | 0.0633 | 0.0006 | −0.2340 | 0.0000 | 431.9334 | −12.9271 |
| N | 0.0000 | −0.0097 | 0.0000 | 0.0439 | 0.0000 | −149.2555 | 3.3755 |
| O | 0.0000 | 0.0009 | 0.0000 | −0.0048 | 0.0000 | 30.6956 | −0.5211 |
| P | 0.0000 | 0.0000 | 0.0000 | 0.0002 | 0.0000 | −2.8405 | 0.0360 |

| Surface No. | S9 | S10 | S11 | S12 | S13 | S14 | S15 |
|---|---|---|---|---|---|---|---|
| K | −81.4061 | −20.5997 | −1.0381 | −2.0008 | −3.2251 | −46.8038 | −1.7401 |
| A | −0.0475 | 0.0260 | 0.1334 | −0.1933 | −0.0917 | −0.0167 | −0.0511 |
| B | −0.1737 | −0.2001 | −0.1308 | 0.1142 | 0.0577 | 0.0051 | 0.0294 |
| C | 0.5662 | 0.5705 | 0.0009 | −0.0483 | −0.0278 | −0.0008 | −0.0162 |
| D | −1.0432 | −0.9373 | 0.2488 | 0.0136 | 0.0097 | 0.0001 | 0.0066 |
| E | 1.2874 | 1.0131 | −0.4319 | −0.0026 | −0.0025 | 0.0000 | −0.0019 |
| F | −1.0922 | −0.7714 | 0.4175 | 0.0003 | 0.0005 | 0.0000 | 0.0004 |
| G | 0.6522 | 0.4302 | −0.2660 | 0.0000 | −0.0001 | 0.0000 | −0.0001 |
| H | −0.2785 | −0.1788 | 0.1172 | 0.0000 | 0.0000 | 0.0000 | 0.0000 |
| J | 0.0854 | 0.0554 | −0.0362 | 0.0000 | 0.0000 | 0.0000 | 0.0000 |
| I | −0.0187 | −0.0126 | 0.0078 | 0.0000 | 0.0000 | 0.0000 | 0.0000 |
| M | 0.0028 | 0.0020 | −0.0011 | 0.0000 | 0.0000 | 0.0000 | 0.0000 |
| N | −0.0003 | −0.0002 | 0.0001 | 0.0000 | 0.0000 | 0.0000 | 0.0000 |
| O | 0.0000 | 0.0000 | 0.0000 | 0.0000 | 0.0000 | 0.0000 | 0.0000 |
| P | 0.0000 | 0.0000 | 0.0000 | 0.0000 | 0.0000 | 0.0000 | 0.0000 |

Figure 11:
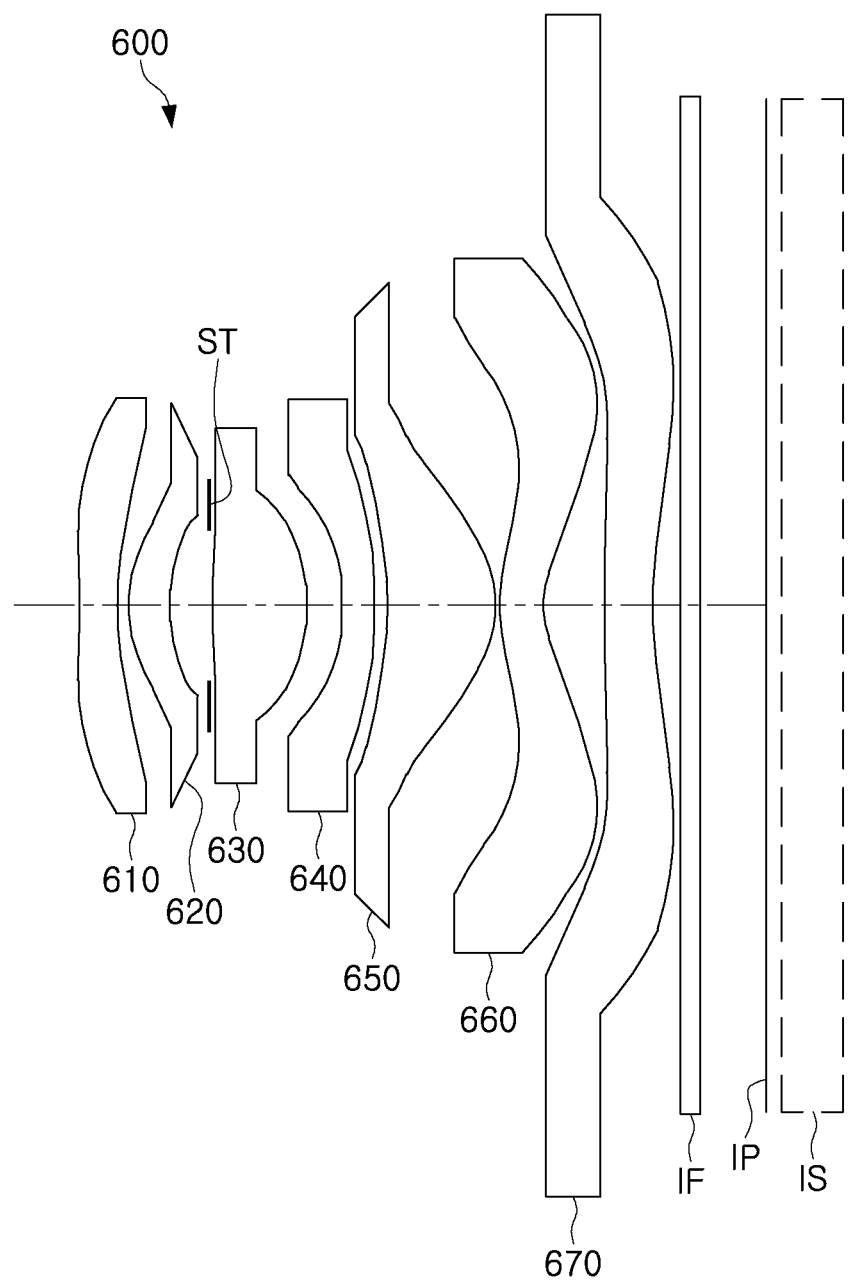
FIG. 11 illustrates a configuration diagram of an example imaging lens system, in accordance with a sixth example.

An example imaging lens system according to a sixth example will be described with reference to FIG. 11.

An example imaging lens system 600 may include a first lens 610, a second lens 620, a third lens 630, a fourth lens 640, a fifth lens 650, a sixth lens 660, and a seventh lens 670.

The first lens 610 may have negative refractive power, and may have a concave object-side surface and a concave image-side surface. The second lens 620 may have positive refractive power, and may have a convex object-side surface and a concave image-side surface. The third lens 630 may have positive refractive power, and may have a convex object-side surface and a convex image-side surface. The fourth lens 640 may have negative refractive power, and may have a concave object-side surface and a convex image-side surface. The fifth lens 650 may have positive refractive power, and may have a concave object-side surface and a convex image-side surface. The sixth lens 660 may have negative refractive power, and may have a convex object-side surface and a concave image-side surface. Additionally, an inflection point may be formed on an object-side surface and an image-side surface of the sixth lens 660. The seventh lens 670 may have negative refractive power, and may have a convex object-side surface and a concave image-side surface. Additionally, an inflection point may be formed on an object-side surface and an image-side surface of the seventh lens 670.

The imaging lens system 600 may further include a filter IF and an imaging plane IP. The filter IF may be disposed between the seventh lens 670 and the imaging plane IP. The imaging plane IP may be formed in a position in which light incident from the first lens 610 to the seventh lens 670 is focused. For example, the imaging plane IP may be formed on one surface of an image sensor IS of a camera module or inside the image sensor IS.

Figure 12:
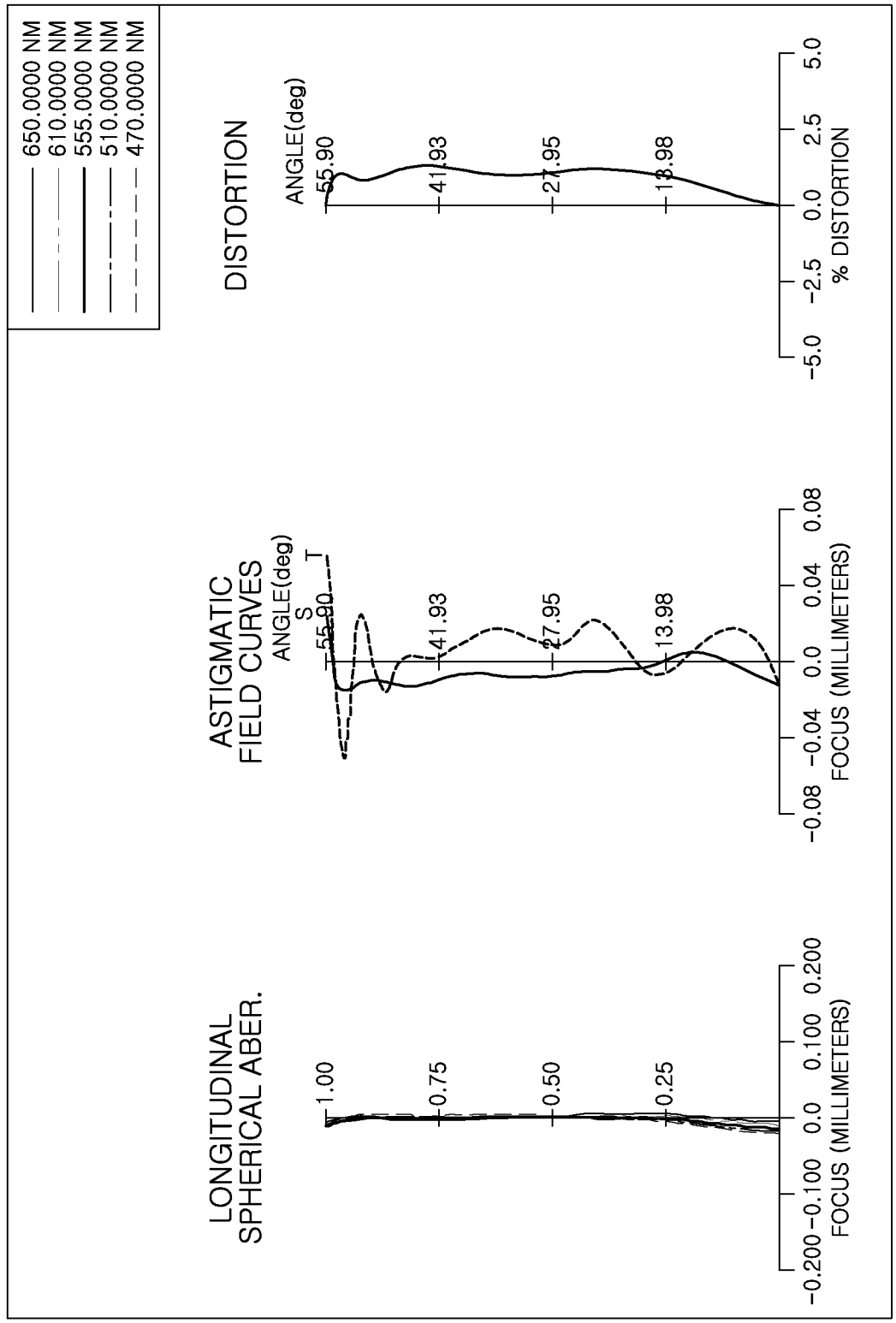
FIG. 12 illustrates an aberration curve of the example imaging lens system illustrated in FIG. 11.

The imaging lens system 600 configured as described above may exhibit aberration characteristics illustrated in FIG. 12. Tables 11 and 12 below illustrate lens characteristics and aspheric values of an imaging lens system according to the present example.

TABLE 11

| Surface No. | Component | Curvature Radius | Thickness/ Distance | Refractive Index | Abbe No. | Effective Radius |
|---|---|---|---|---|---|---|
| S1 | 1st Lens | −4.5000 | 0.4035 | 1.5458 | 56.0 | 2.1500 |
| S2 | | 18.2164 | 0.0995 | | | 1.8573 |
| S3 | 2nd Lens | 1.4470 | 0.4181 | 1.5458 | 56.0 | 1.2843 |
| S4 | | 2.1002 | 0.4264 | | | 0.9532 |
| S5 | Stop | Infinity | 0.0279 | | | 0.7720 |
| S6 | 3rd Lens | 10.0069 | 0.9785 | 1.5458 | 56.0 | 0.9183 |
| S7 | | −2.4305 | 0.3657 | | | 1.2021 |
| S8 | 4th Lens | −4.6126 | 0.3300 | 1.6769 | 19.2 | 1.3650 |
| S9 | | −890.70 | 0.1450 | | | 1.6624 |
| S10 | 5th Lens | −3.3577 | 1.1190 | 1.5458 | 56.0 | 1.7658 |
| S11 | | −1.0934 | 0.0300 | | | 2.0994 |
| S12 | 6th Lens | 1.6129 | 0.4600 | 1.5699 | 37.4 | 2.9817 |
| S13 | | 0.8753 | 0.6367 | | | 3.6049 |
| S14 | 7th Lens | 8.1504 | 0.5000 | 1.5458 | 56.0 | 3.8137 |
| S15 | | 3.7755 | 0.2888 | | | 4.2500 |
| S16 | Filter | Infinity | 0.2100 | 1.5168 | 64.2 | 4.7246 |
| S17 | | Infinity | 0.6773 | | | 4.8048 |
| S18 | Imaging Plane | Infinity | 0.0127 | | | 5.2499 |

TABLE 12

| Surface No. | S1 | S2 | S3 | S4 | S6 | S7 | S8 |
|---|---|---|---|---|---|---|---|
| K | −75.8597 | 75.4758 | −3.7953 | 3.2739 | 85.6148 | 1.4355 | 6.2660 |
| A | 0.1285 | 0.3226 | 0.2451 | 0.0056 | −0.0125 | −0.0706 | −0.2647 |
| B | −0.1184 | −0.7427 | −0.6249 | −0.0088 | −0.0156 | −0.1193 | 0.5427 |
| C | 0.0988 | 1.3230 | 1.2809 | −0.1077 | 0.0320 | 1.2783 | −3.5107 |
| D | −0.0669 | −1.9503 | −2.2569 | −0.0307 | −0.1201 | −7.0302 | 16.3515 |
| E | 0.0357 | 2.2753 | 2.8681 | 0.4758 | 0.1559 | 24.2571 | −49.3148 |
| F | −0.0148 | −2.0444 | −2.5236 | −0.7500 | −0.1070 | −55.1680 | 101.6907 |
| G | 0.0048 | 1.3995 | 1.5574 | 0.4638 | 0.0457 | 82.8134 | −148.2555 |
| H | −0.0012 | −0.7248 | −0.6818 | 0.0543 | −0.0131 | −77.9338 | 155.3042 |
| J | 0.0002 | 0.2810 | 0.2120 | −0.2781 | 0.0026 | 36.1013 | −117.2393 |
| I | 0.0000 | −0.0801 | −0.0463 | 0.1977 | −0.0003 | 8.2401 | 63.1365 |
| M | 0.0000 | 0.0163 | 0.0069 | −0.0729 | 0.0000 | −23.4488 | −23.6183 |
| N | 0.0000 | −0.0022 | −0.0007 | 0.0154 | 0.0000 | 15.0081 | 5.8208 |
| O | 0.0000 | 0.0002 | 0.0000 | −0.0018 | 0.0000 | −4.5698 | −0.8484 |
| P | 0.0000 | 0.0000 | 0.0000 | 0.0001 | 0.0000 | 0.5670 | 0.0553 |

| Surface No. | S9 | S10 | S11 | S12 | S13 | S14 | S15 |
|---|---|---|---|---|---|---|---|
| K | 99.0000 | −33.7649 | −1.0960 | −2.2665 | −4.3538 | −7.0057 | −19.6569 |
| A | −0.1059 | 0.0771 | 0.1908 | −0.2121 | −0.1194 | −0.0782 | −0.0092 |
| B | −0.0177 | −0.3004 | −0.3521 | 0.1663 | 0.1143 | 0.0464 | 0.0009 |
| C | −0.3680 | 0.2001 | 0.5635 | −0.0890 | −0.0652 | −0.0137 | 0.0000 |
| D | 1.9250 | 0.5297 | −0.7040 | 0.0306 | 0.0240 | 0.0023 | 0.0000 |
| E | −4.0832 | −1.3215 | 0.6525 | −0.0070 | −0.0061 | −0.0002 | 0.0000 |
| F | 5.2128 | 1.4408 | −0.4349 | 0.0011 | 0.0011 | 0.0000 | 0.0000 |
| G | −4.4839 | −0.9520 | 0.2067 | −0.0001 | −0.0001 | 0.0000 | 0.0000 |
| H | 2.7138 | 0.4091 | −0.0700 | 0.0000 | 0.0000 | 0.0000 | 0.0000 |
| J | −1.1714 | −0.1139 | 0.0169 | 0.0000 | 0.0000 | 0.0000 | 0.0000 |
| I | 0.3585 | 0.0189 | −0.0029 | 0.0000 | 0.0000 | 0.0000 | |
| M | −0.0759 | −0.0013 | 0.0003 | 0.0000 | 0.0000 | 0.0000 | |
| N | 0.0106 | −0.0001 | 0.0000 | 0.0000 | 0.0000 | 0.0000 | |
| O | −0.0009 | 0.0000 | 0.0000 | 0.0000 | 0.0000 | 0.0000 | |
| P | 0.0000 | 0.0000 | 0.0000 | 0.0000 | 0.0000 | 0.0000 | |

Figure 13:
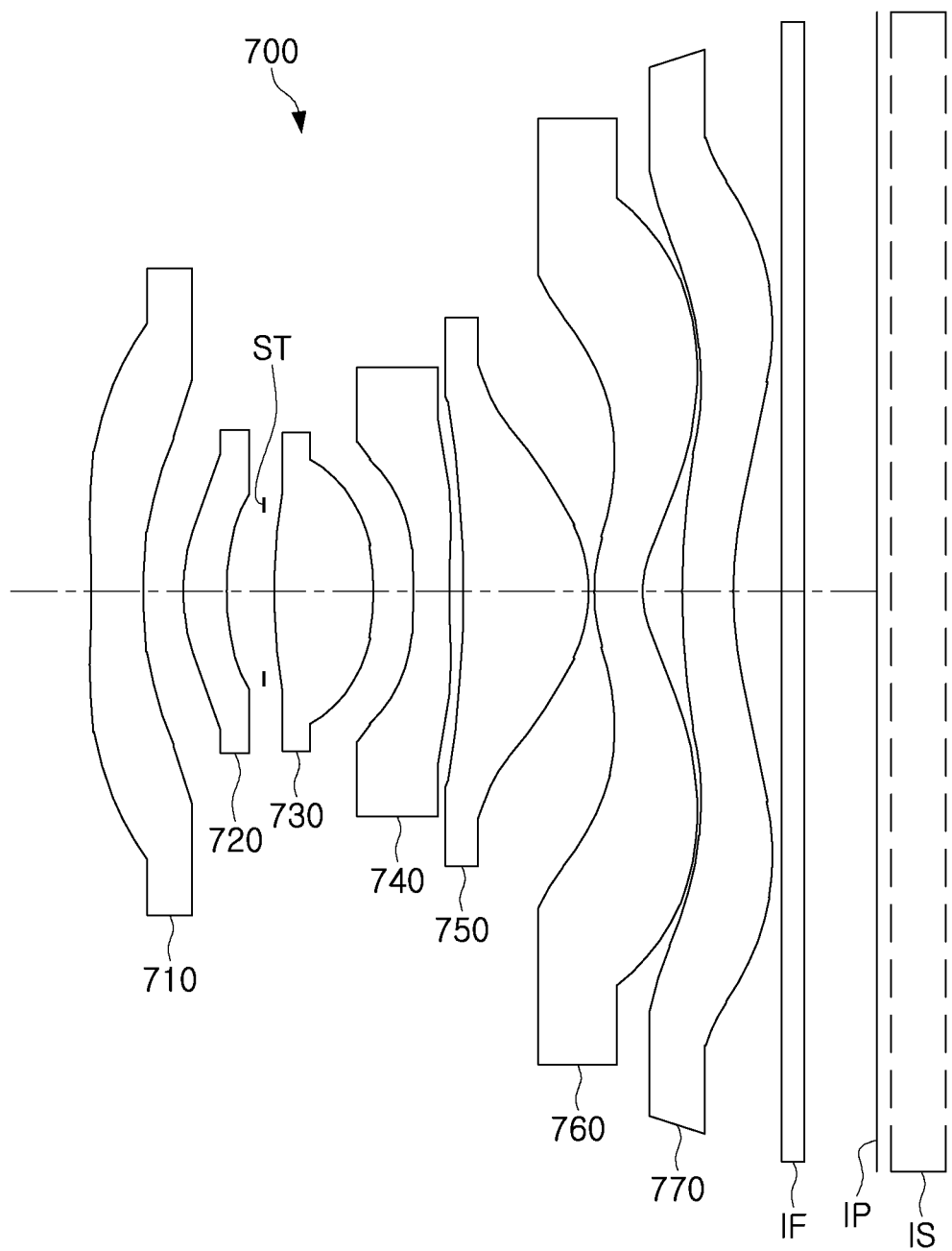
FIG. 13 illustrates a configuration diagram of an example imaging lens system, in accordance with a seventh example.

An example imaging lens system according to a seventh example will be described with reference to FIG. 13.

An example imaging lens system 700 may include a first lens 710, a second lens 720, a third lens 730, a fourth lens 740, a fifth lens 750, a sixth lens 760, and a seventh lens 770.

In an example, the first lens 710 may have negative refractive power, and may have a concave object-side surface and a concave image-side surface. The second lens 720 may have positive refractive power, and may have a convex object-side surface and a concave image-side surface. The third lens 730 may have positive refractive power, and may have a convex object-side surface and a convex image-side surface. The fourth lens 740 may have negative refractive power, and may have a concave object-side surface and a convex image-side surface. The fifth lens 750 may have positive refractive power, and may have a concave object-side surface and a convex image-side surface. The sixth lens 760 may have negative refractive power, and may have a convex object-side surface and a concave image-side surface. Additionally, an inflection point may be formed on an object-side surface and an image-side surface of the sixth lens 760. The seventh lens 770 may have negative refractive power, and may have a convex object-side surface and a concave image-side surface. Additionally, an inflection point may be formed on an object-side surface and an image-side surface of the seventh lens 770.

The imaging lens system 700 may further include a filter IF and an imaging plane IP. The filter IF may be disposed between the seventh lens 770 and the imaging plane IP. The imaging plane IP may be formed in a position in which light incident from the first lens 710 to the seventh lens 770 is focused. For example, the imaging plane IP may be formed on one surface of an image sensor IS of a camera module or inside the image sensor IS.

Figure 14:
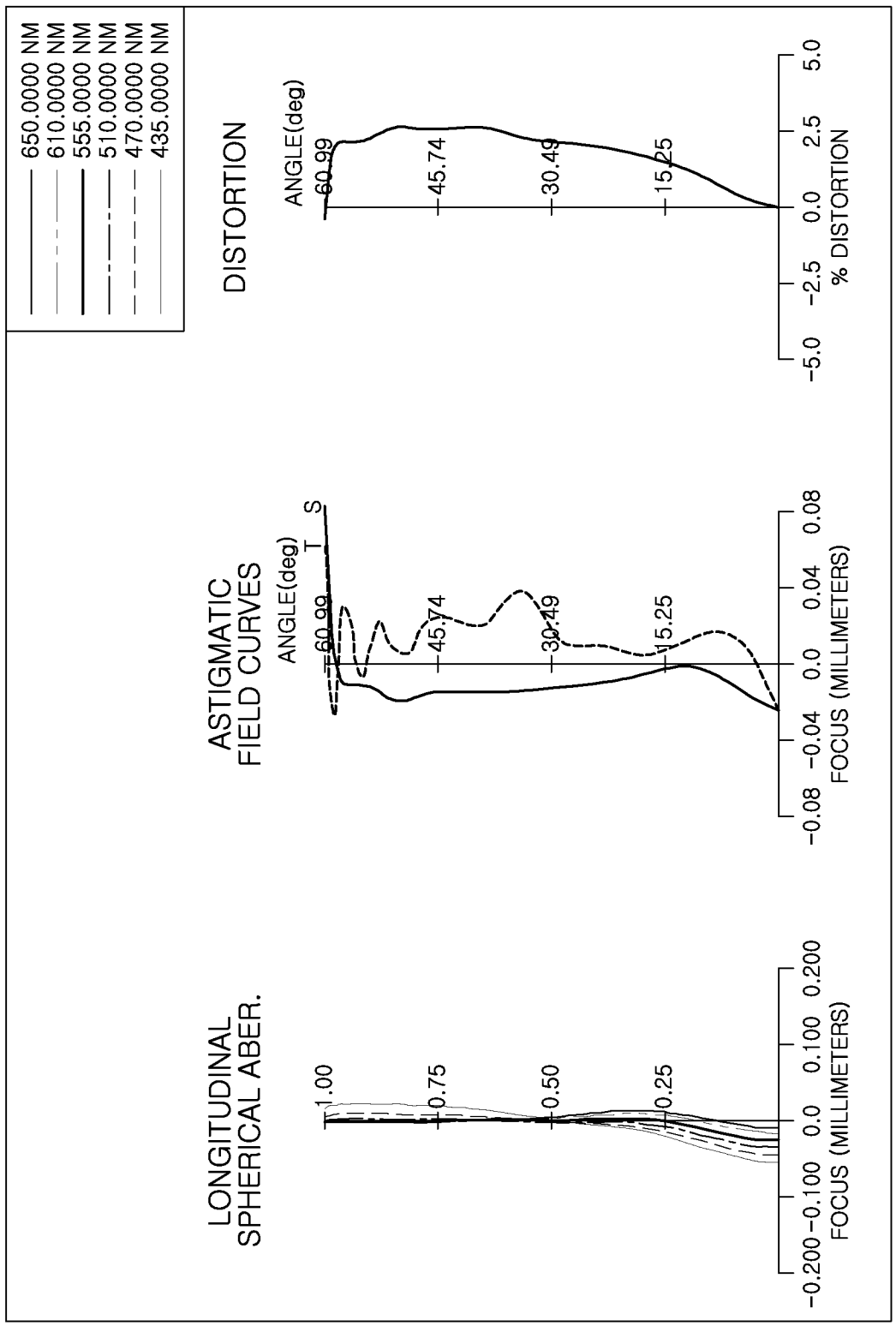
FIG. 14 illustrates an aberration curve of the example imaging lens system illustrated in FIG. 13.

The imaging lens system 700 configured as described above may exhibit aberration characteristics illustrated in FIG. 14. Tables 13 and 14 below illustrate lens characteristics and aspheric values of an imaging lens system according to the present example.

TABLE 13

| Surface No. | Component | Curvature Radius | Thickness/ Distance | Refractive Index | Abbe No. | Effective Radius |
|---|---|---|---|---|---|---|
| S1 | 1st Lens | −4.0861 | 0.4652 | 1.5458 | 56.0 | 2.4600 |
| S2 | | 14.8764 | 0.3630 | | | 1.9555 |
| S3 | 2nd Lens | 1.7751 | 0.3917 | 1.5458 | 56.0 | 1.2877 |
| S4 | | 2.3978 | 0.3404 | | | 0.9000 |
| S5 | Stop | Infinity | 0.1100 | | | 0.7200 |
| S6 | 3rd Lens | 6.4444 | 0.9111 | 1.5458 | 56.0 | 1.0542 |
| S7 | | −2.2855 | 0.3600 | | | 1.2181 |
| S8 | 4th Lens | −7.6898 | 0.3300 | 1.6769 | 19.2 | 1.3609 |

TABLE 13-continued

| Surface No. | Component | Curvature Radius | Thickness/ Distance | Refractive Index | Abbe No. | Effective Radius |
|---|---|---|---|---|---|---|
| S9 |  | −312.52 | 0.1299 |  |  | 1.7300 |
| S10 | 5th Lens | −2.7448 | 1.1499 | 1.5458 | 56.0 | 1.8009 |
| S11 |  | −1.1057 | 0.0300 |  |  | 2.0823 |
| S12 | 6th Lens | 1.4011 | 0.4500 | 1.5699 | 37.4 | 2.9046 |
| S13 |  | 0.7860 | 0.3606 |  |  | 3.6035 |
| S14 | 7th Lens | 6.0000 | 0.4700 | 1.5458 | 56.0 | 3.8600 |
| S15 |  | 4.5741 | 0.4281 |  |  | 4.1473 |
| S16 | Filter | Infinity | 0.2100 | 1.5168 | 64.2 | 4.6450 |
| S17 |  | Infinity | 0.6450 |  |  | 4.7331 |
| S18 | Imaging Plane | Infinity | 0.0250 |  |  | 5.2232 |

TABLE 14

| Surface No. | S1 | S2 | S3 | S4 | S6 | S7 | S8 |
|---|---|---|---|---|---|---|---|
| K | −45.8846 | 49.4317 | −4.5402 | 4.3754 | −34.8124 | 1.6273 | 23.8943 |
| A | 0.1167 | 0.2374 | 0.1363 | 0.0157 | 0.0125 | −0.0298 | −0.1063 |
| B | −0.0962 | −0.2824 | −0.2671 | −0.1120 | 0.0015 | −0.4729 | −0.0560 |
| C | 0.0735 | 0.2741 | 0.4935 | 0.5382 | −0.0546 | 3.3793 | −2.9374 |
| D | −0.0468 | −0.2075 | −0.9765 | −3.1649 | 0.0625 | −16.1601 | 20.4711 |
| E | 0.0237 | 0.0726 | 1.2854 | 11.7761 | −0.0376 | 53.9443 | −72.7735 |
| F | −0.0093 | 0.0507 | −1.0616 | −28.0581 | 0.0142 | −128.6900 | 167.1940 |
| G | 0.0028 | −0.0940 | 0.5750 | 44.8537 | −0.0036 | 222.3306 | −266.6910 |
| H | −0.0006 | 0.0713 | −0.2117 | −49.0043 | 0.0006 | −279.6891 | 303.7493 |
| J | 0.0001 | −0.0340 | 0.0539 | 36.8961 | −0.0001 | 255.4585 | −248.7923 |
| I | 0.0000 | 0.0110 | −0.0095 | −19.1090 | 0.0000 | −167.2282 | 145.2934 |
| M | 0.0000 | −0.0024 | 0.0011 | 6.6869 | 0.0000 | 76.3249 | −58.9500 |
| N | 0.0000 | 0.0003 | −0.0001 | −1.5110 | 0.0000 | −23.0330 | 15.7667 |
| O | 0.0000 | 0.0000 | 0.0000 | 0.1992 | 0.0000 | 4.1257 | −2.4962 |
| P | 0.0000 | 0.0000 | 0.0000 | −0.0116 | 0.0000 | −0.3318 | 0.1770 |

| Surface No. | S9 | S10 | S11 | S12 | S13 | S14 | S15 |
|---|---|---|---|---|---|---|---|
| K | 99.0000 | −34.5084 | −1.0126 | −2.0109 | −4.2133 | −0.6795 | −0.6977 |
| A | 0.3510 | 0.4251 | 0.2982 | −0.1803 | −0.0541 | −0.0086 | 0.0545 |
| B | −1.5534 | −1.2442 | −0.6476 | 0.0608 | 0.0173 | −0.0008 | −0.0842 |
| C | 3.3985 | 2.1762 | 1.1384 | −0.0123 | −0.0077 | 0.0001 | 0.0555 |
| D | −5.0926 | −2.7565 | −1.6200 | 0.0014 | 0.0033 | 0.0000 | −0.0227 |
| E | 5.6073 | 2.7171 | 1.8104 | 0.0000 | −0.0010 | 0.0000 | 0.0063 |
| F | −4.6202 | −2.1169 | −1.5320 | 0.0000 | 0.0002 | 0.0000 | −0.0012 |
| G | 2.8544 | 1.2865 | 0.9642 | 0.0000 | 0.0000 | 0.0000 | 0.0002 |
| H | −1.3145 | −0.5971 | −0.4466 | 0.0000 | 0.0000 | 0.0000 | 0.0000 |
| J | 0.4459 | 0.2070 | 0.1505 | 0.0000 | 0.0000 | 0.0000 | 0.0000 |
| I | −0.1092 | −0.0523 | −0.0363 | 0.0000 | 0.0000 | 0.0000 | 0.0000 |
| M | 0.0187 | 0.0093 | 0.0061 | 0.0000 | 0.0000 | 0.0000 | 0.0000 |
| N | −0.0021 | −0.0011 | −0.0007 | 0.0000 | 0.0000 | 0.0000 | 0.0000 |
| O | 0.0001 | 0.0001 | 0.0000 | 0.0000 | 0.0000 | 0.0000 | 0.0000 |
| P | 0.0000 | 0.0000 | 0.0000 | 0.0000 | 0.0000 | 0.0000 | 0.0000 |

Tables 15 and 16 illustrate optical characteristic values and conditional expression values of the imaging lens systems according to the first to seventh examples.

TABLE 15

|  | $1^{st}$ Example | $2^{nd}$ Example | $3^{rd}$ Example | $4^{th}$ Example | $5^{th}$ Example | $6^{th}$ Example | $7^{th}$ Example |
|---|---|---|---|---|---|---|---|
| f1 | −5.4699 | −5.6001 | −7.6162 | −7.2974 | −6.4643 | −6.5705 | −5.8229 |
| f2 | 9.3805 | 9.9612 | 7.7815 | 6.8103 | 9.3863 | 6.9532 | 10.2477 |
| f3 | 3.6964 | 3.8678 | 4.6700 | 4.1631 | 3.2015 | 3.6854 | 3.2095 |
| f4 | −7.3449 | −7.2101 | −7.2563 | −5.4602 | −8.1463 | −6.8503 | −11.6512 |
| f5 | 4.4544 | 4.5327 | 2.4613 | 2.5083 | 2.5258 | 2.5293 | 2.7190 |
| f6 | 14.6810 | 16.3231 | −5.9383 | −6.2328 | −4.4596 | −4.3412 | −4.2782 |
| f7 | −4.1082 | −4.9698 | −5.2059 | −5.3263 | −12.7955 | −13.4289 | −39.9088 |
| TTL | 7.2719 | 7.1900 | 7.1290 | 7.1290 | 7.1290 | 7.1290 | 7.1700 |
| BFL | 1.4085 | 1.4342 | 1.1066 | 1.2642 | 1.0723 | 1.1888 | 1.3081 |
| f | 3.6642 | 3.5884 | 3.7058 | 3.8625 | 3.1441 | 3.5434 | 2.8995 |

TABLE 15-continued

|  | 1st Example | 2nd Example | 3rd Example | 4th Example | 5th Example | 6th Example | 7th Example |
|---|---|---|---|---|---|---|---|
| f number | 1.9696 | 1.9696 | 1.9696 | 1.9696 | 1.9696 | 1.9696 | 1.9696 |
| ImgHT | 5.1200 | 5.1200 | 5.1200 | 5.1200 | 5.1200 | 5.1200 | 5.1200 |
| FOV | 113.8000 | 113.8000 | 114.0800 | 112.0000 | 121.2000 | 111.8000 | 121.9600 |
| Yc62 | 1.0199 | 1.2345 | 2.1285 | 2.0785 | 2.1925 | 2.1054 | 2.1042 |
| Yc72 | 1.4645 | 2.5600 | 1.8535 | 1.7870 | 2.6690 | 2.3050 | 2.4500 |

TABLE 16

| Conditional Expression | 1st Example | 2nd Example | 3rd Example | 4th Example | 5th Example | 6th Example | 7th Example |
|---|---|---|---|---|---|---|---|
| TTL/(ImgHT*2) | 0.7101 | 0.7021 | 0.6962 | 0.6962 | 0.6962 | 0.6962 | 0.7002 |
| SumD/SumT | 0.8591 | 0.7536 | 0.4718 | 0.4270 | 0.3976 | 0.4113 | 0.4064 |
| TTL/f | 1.9846 | 2.0037 | 1.9237 | 1.8457 | 2.2674 | 2.0119 | 2.4728 |
| f3/f | 1.0088 | 1.0779 | 1.2602 | 1.0778 | 1.0183 | 1.0401 | 1.1069 |
| f4/f | −2.0045 | −2.0093 | −1.9581 | −1.4136 | −2.5910 | −1.9333 | −4.0183 |
| f5/f | 1.2157 | 1.2632 | 0.6642 | 0.6494 | 0.8033 | 0.7138 | 0.9377 |
| f6/f | 4.0066 | 4.5488 | −1.6024 | −1.6137 | −1.4184 | −1.2252 | −1.4755 |
| f7/f | −1.1212 | −1.3850 | −1.4048 | −1.3790 | −4.0697 | −3.7898 | −13.7640 |
| \|f1/f2\| | 0.5831 | 0.5622 | 0.9787 | 1.0715 | 0.6887 | 0.9450 | 0.5682 |
| BFL/f | 0.3844 | 0.3997 | 0.2986 | 0.3273 | 0.3410 | 0.3355 | 0.4512 |
| D12/f | 0.0576 | 0.0493 | 0.0121 | 0.0245 | 0.0286 | 0.0281 | 0.1252 |
| Yc62/Yc72 | 0.6964 | 0.4822 | 1.1484 | 1.1631 | 0.8215 | 0.9134 | 0.8589 |
| (V5 + V7)/V6 | 4.6793 | 4.6793 | 2.9939 | 2.9939 | 2.9939 | 2.9939 | 2.9939 |
| Yc72/L72ED | 0.3826 | 0.5819 | 0.4560 | 0.4215 | 0.6219 | 0.5424 | 0.5908 |

An imaging lens system according to one or more examples may be mounted in a thin portable electronic device while realizing high resolving power and high resolution.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a first lens having a concave object-side surface;
a second lens having positive refractive power;
a third lens having a refractive power;
a fourth lens having a refractive power;
a fifth lens having a refractive power;
a sixth lens having an Abbe number that is greater than 20 and less than 40; and
a seventh lens having a refractive power,
wherein the first to seventh lenses are sequentially arranged from an object-side to an imaging side, and
wherein the imaging lens system satisfies the following conditional expressions:

$$TTL/(ImgHT*2)<0.8,$$

$$100°<FOV, \text{ and}$$

$$2.8<(V5+V7)/V6<4.8,$$

where TTL is a distance from the object-side surface of the first lens to an imaging plane, ImgHT is a height of the imaging plane, FOV is an angle of view of the imaging lens system, V5 is an Abbe number of the fifth lens, V6 is an Abbe number of the sixth lens, and V7 is an Abbe number of the seventh lens.

2. The imaging lens system of claim 1, wherein the second lens has a convex object-side surface.

3. The imaging lens system of claim 1, wherein the third lens has a convex object-side surface.

4. The imaging lens system of claim 1, wherein the fourth lens has a concave object-side surface.

5. The imaging lens system of claim 1, wherein the fifth lens has a convex object-side surface.

6. The imaging lens system of claim 1, wherein the sixth lens has a convex object-side surface.

7. The imaging lens system of claim 1, wherein the seventh lens has a concave object-side surface.

8. The imaging lens system of claim 1, further comprising satisfying the following conditional expression:

$$SumD/SumT<0.9,$$

where SumD is a sum of air gaps between the first lens to the seventh lens, and SumT is a sum of thicknesses of each of the first lens to the seventh lens.

9. The imaging lens system of claim 1, further comprising satisfying the following conditional expression:

$$0.38<Yc72/L72ER,$$

where Yc72 is a shortest distance from a point closest to the imaging plane on an image-side surface of the seventh lens to an optical axis, and L72ER is an effective radius of an image-side surface of the seventh lens.

10. An imaging lens system, comprising:
  a first lens having negative refractive power;
  a second lens having positive refractive power;
  a third lens having a convex object-side surface;
  a fourth lens having a concave object-side surface;
  a fifth lens having positive refractive power;
  a sixth lens having a convex object-side surface; and
  a seventh lens having a refractive power,
  wherein the first to seventh lenses are sequentially arranged from an object-side to an imaging side, and
  wherein the imaging lens system satisfies the following conditional expressions:

$2.8<(V5+V7)/V6<4.8$, and $0.62<TTL/(ImgHT*2)<0.72$, where V5 is an Abbe number of the fifth lens, V6 is an Abbe number of the sixth lens, V7 is an Abbe number of the seventh lens, TTL is a distance from an object-side surface of the first lens to an imaging plane, and ImgHT is a height of the imaging plane.

11. The imaging lens system of claim 10, wherein the first lens has a concave object-side surface.

12. The imaging lens system of claim 10, wherein the second lens has a convex object-side surface.

13. The imaging lens system of claim 10, wherein the fifth lens has a concave object-side surface.

14. The imaging lens system of claim 10, wherein the seventh lens has a convex object-side surface.

15. The imaging lens system of claim 10, further comprising satisfying the following conditional expression:

$-2.0<f6/f<6.0$, where f is a focal length of the imaging lens system, and f6 is a focal length of the sixth lens.

16. The imaging lens system of claim 10, further comprising satisfying the following conditional expression:

$0.4<|f1/f2|<1.5$, where f1 is a focal length of the first lens, and f2 is a focal length of the second lens.

17. An electronic device, comprising the imaging lens system of claim 10.

* * * * *